(12) United States Patent
Lam et al.

(10) Patent No.: US 9,229,647 B2
(45) Date of Patent: Jan. 5, 2016

(54) SYSTEMS, METHODS, AND APPARATUS FOR SPOOFING A PORT OF A HOST ENTITY TO IDENTIFY DATA THAT IS STORED IN A STORAGE SYSTEM AND MAY BE ACCESSED BY THE PORT OF THE HOST ENTITY

(71) Applicant: Cirrus Data Solutions, Inc., Jericho, NY (US)

(72) Inventors: Wai T. Lam, Jericho, NY (US); Wayne Lam, Jericho, NY (US); Chang Liu, Wuhan (CN)

(73) Assignee: Cirrus Data Solutions, Inc., Jericho, NY (US)

( * ) Notice: Subject to any disclaimer, the term of this patent is extended or adjusted under 35 U.S.C. 154(b) by 0 days.

(21) Appl. No.: 14/716,727

(22) Filed: May 19, 2015

(65) Prior Publication Data

US 2015/0254018 A1    Sep. 10, 2015

Related U.S. Application Data

(63) Continuation of application No. 13/725,326, filed on Dec. 21, 2012, now Pat. No. 9,077,752, which is a continuation-in-part of application No. 13/556,726, filed on Jul. 24, 2012, now Pat. No. 8,417,818, which is a continuation of application No. 13/336,257, filed on Dec. 23, 2011, now Pat. No. 8,255,538.

(51) Int. Cl.
*G06F 15/173* (2006.01)
*G06F 3/06* (2006.01)
*H04L 29/08* (2006.01)
*H04L 29/06* (2006.01)

(52) U.S. Cl.
CPC .............. *G06F 3/0635* (2013.01); *G06F 3/061* (2013.01); *G06F 3/0653* (2013.01); *G06F 3/0673* (2013.01); *H04L 67/1097* (2013.01); *H04L 67/16* (2013.01); *H04L 63/101* (2013.01)

(58) Field of Classification Search
CPC ..... H04L 67/16; H04L 67/1097; G06F 3/067; G06F 3/0653
USPC .......... 709/201–203, 223–226; 370/360–363, 370/400–401
See application file for complete search history.

(56) References Cited

U.S. PATENT DOCUMENTS

| 6,421,711 B1 | 7/2002 | Blumenau |
| 6,845,387 B1 | 1/2005 | Prestas |

(Continued)

OTHER PUBLICATIONS

International Search Report dated Mar. 26, 2013 for PCT/US2012/067878, 4 pages.

(Continued)

*Primary Examiner* — Bharat N Barot
(74) *Attorney, Agent, or Firm* — Lucas & Mercanti, LLP; Jonathan A. Tyler

(57) ABSTRACT

A first device in a network, having a first port, receives an identifier of a second port of a second device in the network, the network comprising a host entity, a switch, and a storage system. The first port of the first device spoofs the second port of the second device, during a communication with the switch. The first device receives information identifying a third port of a third device in the network that is zoned to the second port of the second device. The device identifies data stored in the storage system that may be accessed by the host entity, based at least on the information.

18 Claims, 19 Drawing Sheets

(56) References Cited

U.S. PATENT DOCUMENTS

| | | | |
|---|---|---|---|
| 7,136,923 | B2 | 11/2006 | Yamaguchi |
| 7,203,730 | B1 | 4/2007 | Meyer |
| 7,379,960 | B2 | 5/2008 | Dimitroff |
| 7,447,197 | B2 | 11/2008 | Terrell |
| 7,620,742 | B2 | 11/2009 | Kaushik |
| 7,702,962 | B2 | 4/2010 | Numanoi |
| 7,839,865 | B2 | 11/2010 | Doherty |
| 7,843,869 | B2 * | 11/2010 | Ikawa .................... H04L 67/12 370/328 |
| 7,865,627 | B2 | 1/2011 | Kaushik |
| 7,908,358 | B1 | 3/2011 | Prasad |
| 7,908,656 | B1 | 3/2011 | Mu |
| 7,912,051 | B1 | 3/2011 | Rowlands |
| 7,961,594 | B2 * | 6/2011 | Alon ................... H04L 41/0622 370/216 |
| 8,028,062 | B1 | 9/2011 | Wigmore |
| 8,028,141 | B2 | 9/2011 | Bakke |
| 8,255,538 | B1 | 8/2012 | Lam |
| 8,417,818 | B1 | 4/2013 | Lam |
| 2004/0054782 | A1 | 3/2004 | Donze |
| 2004/0064543 | A1 | 4/2004 | Ashutosh |
| 2004/0220971 | A1 | 11/2004 | Kausnik |
| 2006/0168109 | A1 * | 7/2006 | Warmenhoven .... H04L 41/0893 709/223 |
| 2007/0239989 | A1 | 10/2007 | Barnett |
| 2008/0250096 | A1 * | 10/2008 | Koide .......................... 709/201 |
| 2008/0301763 | A1 * | 12/2008 | Sasaki et al. ................. 726/1 |
| 2009/0234982 | A1 | 9/2009 | Li |
| 2009/0282283 | A1 * | 11/2009 | Sakakura ............ G06F 11/2033 709/223 |
| 2010/0198972 | A1 | 8/2010 | Umbehocker |
| 2010/0325314 | A1 * | 12/2010 | Onuki .......................... 709/226 |
| 2011/0093849 | A1 | 4/2011 | Chawla |
| 2011/0173504 | A1 | 7/2011 | Kabakura |
| 2012/0011240 | A1 | 1/2012 | Hara |
| 2012/0036258 | A1 * | 2/2012 | Hirata ................ H04L 67/1097 709/224 |
| 2012/0089713 | A1 | 4/2012 | Carriere |

OTHER PUBLICATIONS

Written Opinion for PCT/US2012/067878, 11 pages.
Secure San Zoning—Best Practices, Nov. 15, 2010, http://community.brocade.com/dtscp75322/attachments/dtscp75322/fibre/8903/1/Zoning_Best_Practices_WP-00.pdf (retrieved Sep. 29, 2015), pp. 1-10.
"Fibre Channel address weakness", Apr. 4, 2007, http://searchitchannel.techtarget.com/feature/Fibre-Channel-address-weaknesses (retrieved Sep. 29, 2015), pp. 1-5.
International Search Report dated Jul. 11, 2013 for PCT/US2012/071236, 5 pages.
Written Opinion for PCT/US2012/071236, 8 pages.
"Fibre Channel Man-In-Ther-Middle Attack Assessment Exercise", Apr. 30, 2007, http://searchitchannel.techtarget.com/feature/Fibre-Channel-man-in-the-middle-attack-assessment-exercise (retrieved Sep. 29, 2015), pp. 1-10.

* cited by examiner

| | 650 | |
|---|---|---|
| | 625 | 629 |
| | World Wide Port Name (Target or Initiator) | Switch Port Number |
| 602 | WWPN-1 (I-1) | P-1 |
| 604 | WWPN-2 (I-2) | P-2 |
| 606 | WWPN-3 (I-3) | P-3 |
| ... | ... | ... |
| 614 | WWPN-5 (T-1) | P-5 |
| ... | ... | ... |

*FIG. 6*

SYSTEMS, METHODS, AND APPARATUS FOR SPOOFING A PORT OF A HOST ENTITY TO IDENTIFY DATA THAT IS STORED IN A STORAGE SYSTEM AND MAY BE ACCESSED BY THE PORT OF THE HOST ENTITY This application is a continuation of U.S. patent application Ser. No. 13/725,326, filed Dec. 21, 2012, which is a continuation-in-part of U.S. patent application Ser. No. 13/556,726, filed Jul. 24, 2012, which is a continuation of U.S. patent application Ser. No. 13/336,257, filed Dec. 23, 2011, now issued as U.S. Pat. No. 8,255,538, each of which is hereby incorporated by reference in its entirety.

TECHNICAL FIELD

This specification relates generally to systems and methods for storing and managing data, and more particularly to systems and methods for providing data management services with respect to data maintained in a storage system.

BACKGROUND

The storage of electronic data, and more generally, the management of electronic data, has become increasingly important. With the growth of the Internet, and of cloud computing in particular, the need for data storage capacity, and for methods of efficiently managing stored data, continue to increase. Many different types of storage devices and storage systems are currently used to store data, including disk drives, tape drives, optical disks, redundant arrays of independent disks (RAIDs), Fibre channel-based storage area networks (SANs), etc.

In many enterprise-level storage systems, it is useful to add data management services to the existing storage system in order to perform one or more desired tasks. For example, it may be useful in some storage systems to add functionality to copy data, to perform a snapshot of a data image, to back up data, to replicate data, to perform data migration from one storage device or system to another, etc. It is typically desirable to install any additional functionality for performing such services without causing any interruption to the storage system's operations.

SUMMARY

In accordance with an embodiment, a method of obtaining information relating to data stored in a network is provided. The network includes a host entity, a switch, and a storage system. A first device in the network, having a first port, receives an identifier of a second port of a second device in the network. The first port of the first device spoofs the second port of the second device during a communication with the switch. The first device receives information identifying a third port of a third device in the network that is zoned to the second port of the second device. The first device identifies, based at least on the information, data stored in the storage system that may be accessed by the host entity.

In one embodiment, the network is a Fibre channel based storage area network and the switch is a Fibre channel switch.

In one embodiment, the identifier is added to the first port of the first device. The identifier may be a world wide port name, for example. The first port of the device may transmit, to the switch, a request including the identifier.

In one embodiment, the second device comprises the storage system and the third device comprises the host entity. The first port of the first device is registered with the switch. The first device receives, from the host entity, a request to register the third port, the request including a world wide port name of the third port. The world wide port name of the third port is added to a fourth port of the first device, and the first device spoofs the third port of the host entity during a second communication with the storage system to identify the data stored in the storage system that may be accessed by the host entity.

In another embodiment, the second device comprises the host entity and the third device comprises the storage system. The first device receives, from the host entity, a request to register the second port, the request including a world wide port name of the second port. The world wide port name of the second port is added to a fifth port of the first device. The first device transmits, to the switch, a request for information identifying one or more devices that are zoned to the second port, the request including the world wide port name of the second port.

In another embodiment, the first device is located in a path between the switch and a second switch.

In accordance with another embodiment, a method of determining information relating to data stored in a network is provided. A first identifier associated with a first port of a storage system is received from the storage system, by a device located in a path between the storage system and a switch in a network. The first identifier is used by the device to spoof the first port of the storage system during a first communication with the switch. The device receives, from a host server connected to the switch, a request to register a second port of the host server, the request including a second identifier associated with the second port. The device uses the second identifier to spoof the second port of the host server during a second communication with the storage system, and receives from the storage system information identifying data that is stored in the storage system and may be accessed by the second port of the host server.

In one embodiment, the first identifier is added to a third port of the device, and the device transmits, to the switch, via the third port, a request comprising the first identifier. The second identifier is added to a fourth port of the device, and the device transmits to the storage system a request for information identifying data that is stored in the storage system and may be accessed by the second port of the host server.

In accordance with another embodiment, a method of determining information related to data stored in a network is provided. A device located in a path between a switch port of a switch and an initiator port of a host entity identifies an initiator world wide port name of the initiator port, in a registration procedure. The initiator world wide port name is added to a first device port of the device. The device transmits, to the switch, a request for information identifying a port that is associated with the initiator world wide port name, and receives, from the switch, a target world wide port name of a target port of a storage system that is associated with the initiator port. The device identifies a storage volume in the storage system that is associated with the initiator port, based on the target world wide port name and the initiator world wide port name.

In one embodiment, the registration procedure comprises registration by the initiator port with the device. The registration procedure may comprise a Fibre channel log-in procedure, for example.

In one embodiment, the target world wide port name is added to a second device port of the device. The initiator world wide port name may be assigned to the first device port.

In one embodiment, the device receives, from the switch, a target world wide port name of a target port of the storage system that is zoned to the initiator port. The device or the switch may access a Simple Name Server table that identifies, for each of one or more ports of the switch, a corresponding world wide port name.

In one embodiment, the device transmits to the storage system a REPORT LUN command including the initiator world wide port name, and receives from the storage system, in response to the REPORT LUN command, information identifying the storage volume to which the initiator world wide port name has access.

In another embodiment, the device may transmit to the storage system a SCSI inquiry relating to the storage volume to which the initiator world wide port name has access, and receive, in response to the SCSI inquiry, information indicating a global unique identifier of the storage volume. The device determines whether two storage volumes associated with the initiator world wide port name are identical based on the global unique identifier.

In one embodiment, the device provides a service with respect to the identified storage volume.

In accordance with another embodiment, a method of providing data management services is provided. An identifier of an initiator port of a host entity is determined, by a device located in a path between the initiator port and a switch port of a switch. Data that is stored in a storage system and to which the initiator port has access is identified, based on the identifier, and a data management service is provided with respect to the identified data.

These and other advantages of the present disclosure will be apparent to those of ordinary skill in the art by reference to the following Detailed Description and the accompanying drawings.

BRIEF DESCRIPTION OF THE DRAWINGS

FIG. 6 shows an example of a Simple Name Server table in accordance with an embodiment;

DETAILED DESCRIPTION

Figure 1:
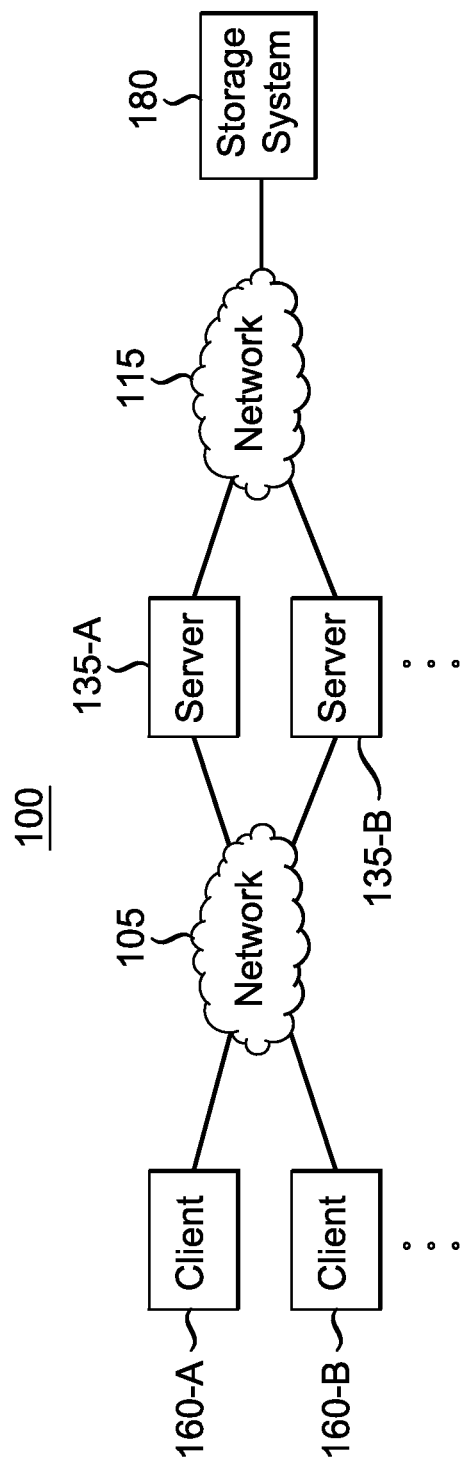
FIG. 1 shows a communication system that may be used to provide data storage services and data management services in accordance with an embodiment.

In accordance with various embodiments, methods and systems for providing data storage services and data management services are provided. In accordance with embodiments described herein, a device, or appliance, is inserted in a selected location in a network. For example, the appliance may be inserted in a path between a switch and a storage system. Alternatively, the appliance may be inserted in a path between a host entity and a switch. Alternatively, the appliance may be inserted in a path between a first switch and a second switch. In other embodiments, the appliance may be inserted in a different location within a network. The appliance obtains information identifying selected ports of various devices in the network, and uses the information obtained to identify data stored in a storage system in the network that may be accessed by a selected host entity. Alternatively, identity information relating to selected ports of various devices in the network may be manually entered into the appliance to facilitate the process of identifying the ports and/or devices.

In accordance with one embodiment, a first device in a network, having a first port, receives an identifier of a second port of a second device in the network. The identifier of the second port may be received by the first device automatically (for example, from another device), or may be entered into first device manually. The network includes a host entity, a switch, and a storage system. The first port of the first device spoofs the second port of the second device, during a communication with the switch. The first device receives information identifying a third port of a third device in the network that is zoned to the second port of the second device. The first device identifies data stored in the storage system that may be accessed by the host entity, based at least on the information.

In another embodiment, an interceptor device is inserted in a network, in a path between a switch port of a switch and a target port of a storage system. In one embodiment, the interceptor device is inserted in a Storage Area Network (SAN). The interceptor device spoofs selected components of the storage area network to obtain information concerning storage configuration and data stored in the storage system. Specifically, a target world wide port name of the target port is identified by the device, and an upstream port of the device registers with the switch based on the target world wide port name, in a first registration procedure. Registration information identifying an initiator world wide port name of an initiator port of a host entity that is zoned to the target port is received, in a second registration procedure. Registration information may be received from one or more initiator ports. The initiator world wide port names of the initiator ports are determined based on the registration information. For each of the one or more initiator ports of the host entity, one or more storage volumes in the storage system associated with the respective initiator port are identified, based on the initiator world wide port name of the respective initiator port. In this manner, the interceptor device identifies one or more storage volumes to which the host entity has access.

In another embodiment, an interceptor device located in a path between a switch port of a switch and an initiator port of a host entity identifies an initiator world wide port name of the initiator port, in a registration procedure. The registration procedure may be performed automatically or manually. The initiator world wide port name is added to a first device port of the interceptor device. The interceptor device transmits to the switch a request for information identifying ports that are associated with the initiator port. The interceptor device receives a target world wide port name of a target port of a storage system that is associated with the initiator port. The target world wide port name is added to a second device port of the interceptor device.

Advantageously, the methods, systems, and apparatus described herein allow a transparent, or nearly transparent, pass-through of commands and other data traffic between the host entity and the storage system, after the interceptor device has been inserted into the network. This feature provides the opportunity and ability to intercept, analyze, redirect, and/or reprocess the I/O commands and other data traffic flowing between host entity and the storage system.

In one embodiment, the interceptor device may also identify a storage volume in the storage system that may be accessed by the initiator port of the host entity, based on the target world wide port name and the initiator world wide port name.

After identifying the storage volumes that the host entity may access, the interceptor device may provide additional data management services with respect to data stored in the volumes. For example, the interceptor device may copy data, perform a snapshot of the data, back up the data, replicate the data, perform a data migration operation, etc.

The term spoof is used herein to indicate that a first device, or first port, uses, or impersonates, an identifier, such as a world wide port name, of a second device, or second port, during a communication with a third device or third port, employing any means provided or accepted by the hardware and/or software associated with the devices or ports.

FIG. 1 shows a communication system 100 that may be used to provide data storage and data management services in accordance with an embodiment. Communication system 100 includes a first network 105, one or more clients 160-A, 160-B, etc., and one or more servers 135-A, 135-B, etc. Communication system 100 also comprises a second network 115 and a storage system 180. While two clients 160 are shown in FIG. 1, in other embodiments communication system 100 may include more or fewer than two clients. Similarly, while two servers 135 are shown in FIG. 1, in other embodiments communication system 100 may include more or fewer than two servers.

For convenience, the term "client 160" is used herein to refer to any one of clients 160-A, 160-B, etc. Accordingly, any discussion herein referring to "client 160" is equally applicable to each of clients 160-A, 160-B, etc. Similarly, the term "server 135" is used herein to refer to any one of servers 135-A, 135-B, etc. Accordingly, any discussion herein referring to "server 135" is equally applicable to each of servers 135-A, 135-B, etc.

Storage system 180 stores data. For example, storage system 180 may store any type of data, including, without limitation, files, spreadsheets, images, audio files, source code files, etc. Storage system 180 may from time to time receive, from another device, a request to store specified data, and in response, store the specified data. For example, storage system 180 may store data received from a server 135. Storage system 180 may also from time to time receive, from another device, a request to access stored data and, in response, provide the requested data to the requesting device, or provide access to the requested data. Storage system 180 may verify that the requesting device is authorized to access the requested data prior to providing access to the data. Storage system 180 is connected to network 115.

Network 115 may comprise one or more of a number of different types of networks, such as, for example, a Fibre Channel-based storage area network (SAN), an iSCSI-based network, a local area network (LAN), a wide area network (WAN), or a wireless network. Other networks may be used.

Server 135 from time to time receives from a client 160 a request for stored data, communicates with storage system 180 to retrieve the requested data, and provides the requested data to the requesting client. Server 135 is connected to network 115 and communicates with storage system 180 via network 115. Server 135 is also connected to network 105 and communicates with clients 160 via network 105. For example, server 135 may be a personal computer, a workstation, a mainframe computer, a server computer, a workstation, etc. In some embodiments, a server, or a cluster of two or more servers, may be defined as a "host entity." A host entity is sometimes alternatively referred to as a host server.

In the exemplary embodiment of FIG. 1, network 105 may include one or more of a number of different types of networks, such as, for example, an intranet, a local area network (LAN), a wide area network (WAN), or a wireless network. Other networks may be used. Alternatively, network 105 may include a combination of different types of networks.

Client 160 may be any computer or other device capable of communicating via network 105. For example, client 160 may be, without limitation, a personal computer, a laptop computer, a tablet device, a server computer, a mainframe computer, a workstation, a wireless device such as a cellular telephone, a personal digital assistant, etc. Client 160 from time to time transmits a request for data to a server 135. For example, client 160 may transmit to server 135 a request for stored data when a user of client 160 requests access to a web page, to a stored file, to a stored email, to stored data relating to an account, etc.

In one embodiment, server 135 may comprise a web server that maintains a website and provides access to one or more web pages associated with the website. More particularly, server 135 may provide to clients 160 one or more cloud-based services, including a cloud-based storage service that allows a client 160 to store data remotely, and transparently, via the Internet, and to access the stored data via the Internet.

In other embodiments, server 135 may provide other types of services. For example, server 135 may comprise a file server that provides access to stored files, an email server that provides access to stored emails, etc.

Figure 2:
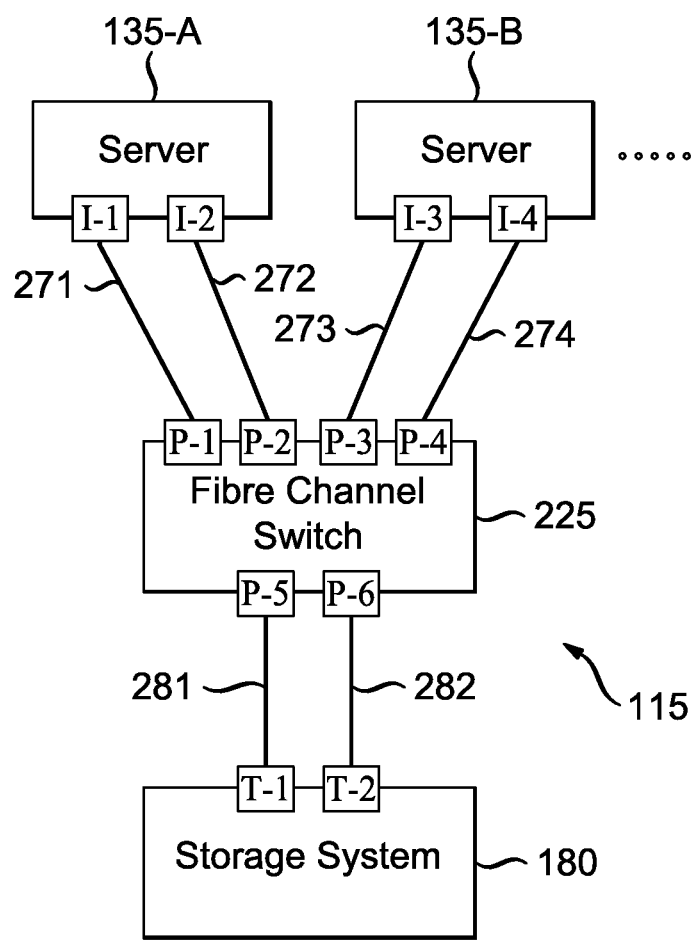
FIG. 2 shows components of a Fibre Channel-based storage area network (SAN) in accordance with an embodiment.

In an illustrative embodiment, network 115 is a Fibre Channel-based storage area network (SAN). FIG. 2 shows components of Fibre channel-based storage area network (SAN) 115 in accordance with an embodiment. Fibre channel-based storage area network (SAN) 115 includes a Fibre channel switch 225. Server 135-A is connected to Fibre channel (FC) switch 225 by links 271 and 272. Server 135-B is connected to FC switch 225 by links 273 and 274. FC switch 225 is connected to storage system 180 by links 281 and 282. In other embodiments, Fibre channel-based SAN 115 may have any type of topology, including, without limitation, a point-to-point topology, an arbitrated loop topology, a switched fabric topology, or other topology.

Certain devices within Fibre channel-based SAN 115 include one or more ports; a port is an entity that actively communicates via network 115. Ports located on servers 135 are sometimes referred to herein as initiator ports. Ports located on storage system 180 are sometimes referred to herein as target ports. Ports located on FC switch 225 are sometimes referred to herein as switch ports. In the illustrative embodiment of FIG. 2, server 135-A includes initiator ports I-1 and I-2, and server 135-B includes initiator ports I-3 and I-4. Storage system 180 includes target ports T-1 and T-2. FC switch 225 includes switch ports P-1, P-2, P-3, P-4, P-5, and P-6. Servers 135, storage system 180, and FC switch 225 may comprise more or fewer ports than those shown in FIG. 2.

Data is transmitted within Fibre channel-based SAN 115 via links. In the illustrative embodiment, link 271 connects initiator port I-1 (of server 135-A) to port P-1 of FC switch 225. Link 272 connects initiator port I-2 (of server 135-A) to port P-2 of FC switch 225. Link 273 connects initiator port I-3 (of server 135-B) to port P-3 of FC switch 225. Link 274 connects initiator port I-4 of server 135-B to port P-4 of FC switch 225. Link 281 connects port P-5 of FC switch 225 to target port T-1 of storage system 180. Link 282 connects port P-6 of FC switch 225 to target port T-2 of storage system 180.

In an embodiment, communications among components of Fibre-Channel-based SAN 115 are conducted in accordance with Fibre Channel Protocol (FCP). For example, servers 135, FC switch 225 and storage system 180 may transmit SCSI commands via network 115.

Figure 3:
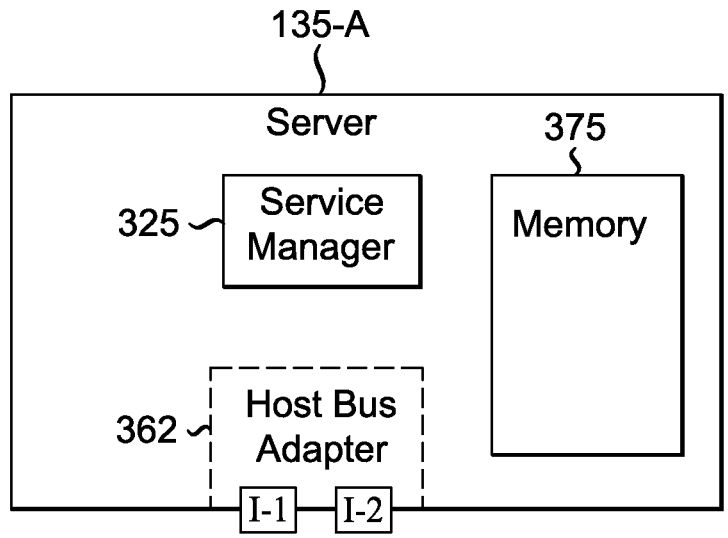
FIG. 3 shows functional components of a server in accordance with an embodiment.

FIG. 3 shows functional components of a server 135 in accordance with an embodiment. For exemplary purposes, FIG. 3 shows components of server 135-A; however, FIG. 3 and the discussion below is equally applicable to any server in communication system 100. Server 135-A includes a service manager 325, a memory 375, and initiator ports I-1 and I-2. Server 135-A may include more or fewer than two initiator ports.

Service manager 325 controls the activities of various components within server 135-A. Service manager 325 is a functional process that may be implemented by software, hardware, or a combination of software and hardware. Memory 375 is used by various components of server 135-A to store data. In the illustrative embodiment of FIG. 3, initiator ports I-1 and I-2 are implemented in a host bus adapter 362 located in server 135-A. Server 135-A may include multiple host bus adapters. In other embodiments, initiator ports I-1 and I-2 may be implemented in a different component of server 135-A. Server 135-A may include components not shown in FIG. 3.

Figure 4:
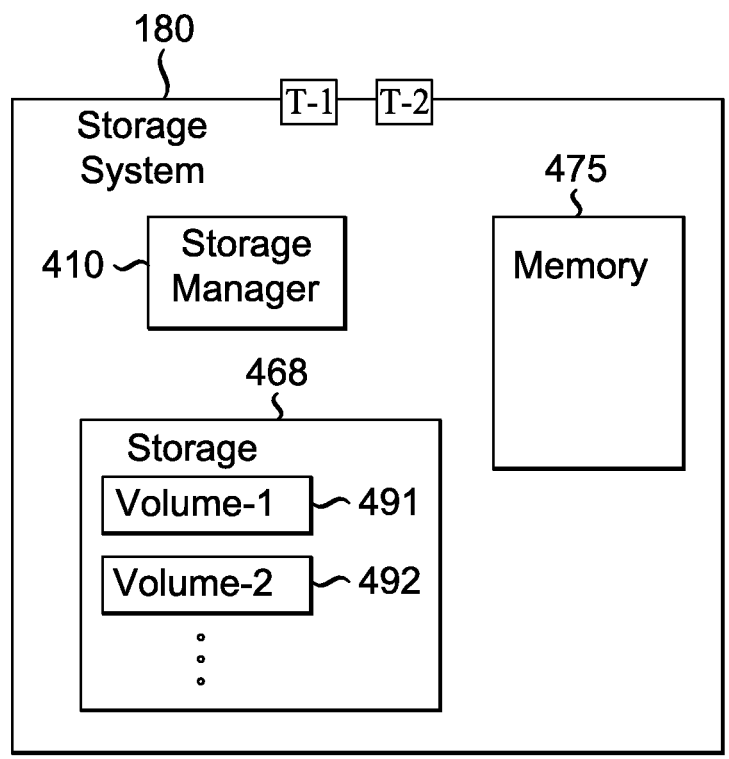
FIG. 4 shows functional components of a storage system in accordance with an embodiment.

FIG. 4 shows functional components of storage system 180 in accordance with an embodiment. Storage system 180 comprises a storage manager 410, a memory 475, and a storage 468. Storage manager 410 controls the operations of various components of storage system 180. Storage manager 410 may comprise functionality to store data using one or more of a variety of data storage techniques. For example, storage manager 410 may store data using a virtualization method, using various RAID configurations, etc. Storage manager 410 is a functional process that may be implemented by software, hardware, or a combination of software and hardware. Memory 475 may be used by various components of storage system 180 to store data. Storage system 180 also comprises target ports T-1 and T-2. In one embodiment, target ports T-1 and T-2 may be implemented in one or more host bus adapters. In one embodiment, storage manager 410 and one or more target ports may be implemented as a subsystem referred to as a storage controller. Storage system 180 may include components not shown in FIG. 4.

Storage 468 comprises one or more storage devices (not shown) capable of storing data. Storage 468 may comprise one or more block-level storage devices, one or more file-level storage devices, and/or other types of storage devices. For example, storage 468 may comprise, without limitation, one or more disk drives, optical disks, tape drives, etc. Storage 468 may comprise a redundant array of independent disks (RAID) or multiple RAIDS. Storage 468 may include local and/or distributed storage. Other types of storage devices may be used.

Data stored in storage system 180 may be organized into logical unit numbers (LUNs), also referred to as volumes. In the illustrative embodiment of FIG. 4, storage 468 includes a plurality of volumes, including volumes 491 and 492. A LUN, or volume, is a logical unit and therefore may comprise data distributed across multiple storage devices.

Figure 5:
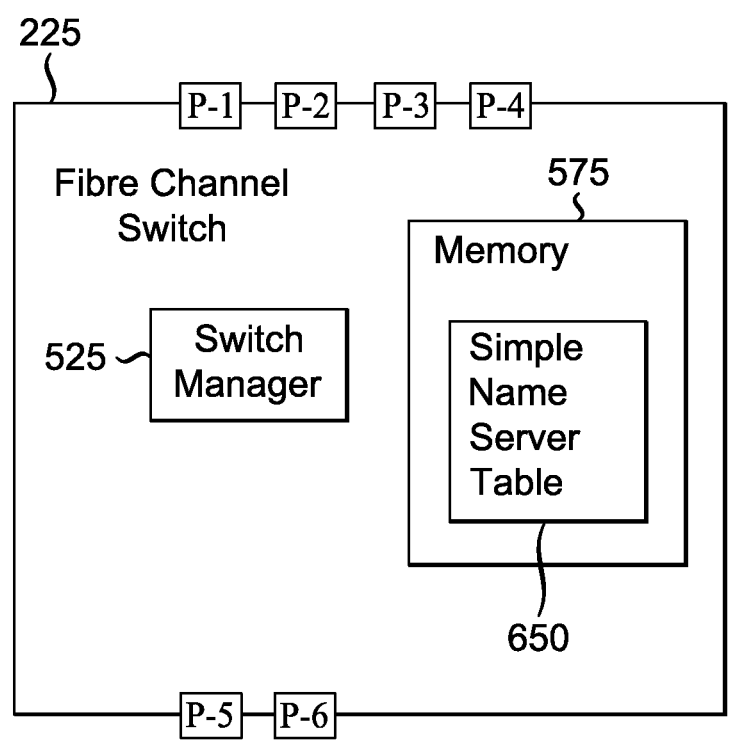
FIG. 5 shows functional components of a Fibre channel switch in accordance with an embodiment.

FIG. 5 shows functional components of FC switch 225 in accordance with an embodiment. FC switch 225 comprises a switch manager 525 and a memory 575. Switch manager 525 controls the activities of various components within FC switch 225. Switch manager 525 is a functional process that may be implemented by software, hardware, or a combination of software and hardware. Memory 575 is used by various components of FC switch 225 to store control data. FC switch 225 also comprises switch ports P-1, P-2, P-3, P-4, P-5, and P-6. In one embodiment, ports P-1, P-2, P-3, P-4, P-5, and P-6 may be implemented using one or more host bus adapters. FC switch 225 may include components not shown in FIG. 5.

From time to time switch manager 525 may direct an I/O command received at a first switch port of FC 225 to a second switch port of FC switch 225.

When a port on a device within Fibre channel-based SAN 115 is connected to FC switch 225, the port logs in, or registers, with FC switch 225, in a known registration procedure, or in a log-in procedure. Each Fibre channel port is assigned a unique identifier referred to as a world wide port name (WWPN) by the manufacturer of the device. Each WWPN is a unique sixty-four bit number. Accordingly, each initiator ports I-1, I-2, I-3, and I-4 has a respective WWPN. Each of ports P-1 through P-6 on FC switch 225 also has a respective WWPN. Each of target ports T-1 and T-2 of storage system 180 has a respective WWPN.

For convenience only, a world wide port name of an initiator port is referred to herein as an initiator world wide port name, and a world wide port name of a target port is referred to herein as a target world wide port name. However, as discussed above, each world wide port name (regardless of whether it is associated with an initiator port or a target port) is a unique sixty-four bit number. The terms initiator world wide port name and target world wide port name are used herein for convenience only; these terms do not reflect different "types" of world wide port names, and do not reflect any characteristic of a world wide port name itself that distinguishes a world wide port name associated with an initiator port from a world wide port name associated with a target port.

FC switch 225 maintains a Simple Name Server table to store information concerning various ports within Fibre channel-based SAN 115. FIG. 6 shows an example of a Simple Name Server table in accordance with an embodiment. Simple Name Server table 650 comprises a column 625 that stores a world wide port name of an initiator port or target port, and a column 629 that stores an identifier of a port of FC switch 225 to which the initiator or target port is connected. Referring to record 602, a first world wide port name, WWPN-1, which is assigned to initiator port I-1, is connected to port P-1 on FC switch 225. Record 604 indicates that WWPN-2 (assigned to initiator port I-2) is connected to port P-2 on FC switch 225. Record 606 indicates that WWPN-3 (assigned to initiator port I-3) is connected to port P-3 on FC switch 225. Record 614 indicates that WWPN-5 (assigned to target port T-1) is connected to port P-5 on FC switch 225.

Simple Name Server table 650 is stored in memory 575 of FC switch 225, as shown in FIG. 5. Server 135 and storage system 180 may from time to time be given access Simple Name Server table 650.

When an initiator port of a server 135, or a target port of storage system 180, is connected to a port on FC switch 225, the initiator or target port transmits a registration request, also referred to as a Fibre channel log-in request, to FC switch 225. In response, Simple Name Server table 650 is updated to record the WWPN of the requesting port and the corresponding port on FC switch 225. When an initiator or target port is disconnected from FC switch 225, Simple Name Server table 650 is updated to reflect the change.

I/O Commands

From time to time, a server 135 may generate and transmit to storage system 180 (via FC switch 225) an input/output (I/O) command requesting that storage system 180 store data in a specified storage volume. An I/O command that relates to a particular storage volume, originates from a particular initiator port on server 135, and is intended for a desired target port of storage system 180 may include, among other data, (1) an identifier of the port on switch 225 that corresponds to (i.e., that is connected to) the originating initiator port of server 135; (2) an identifier of a port of switch 225 that corresponds to (i.e., that is connected to) the desired target port of storage system 180; and (3) an identifier of the particular volume to which the I/O command is related.

LUN Masking

It is sometimes desirable to limit or restrict access to a particular storage volume to a single server or to a cluster of one or more servers defined as a single host entity. Accordingly, in accordance with an embodiment, a particular volume maintained in storage system 180 may be assigned to all ports of a selected server (and to no other ports on any other server). In another embodiment, access to a particular storage volume may be limited to a particular host entity (which may include multiple servers). Accordingly, the storage volume may be assigned to all ports of each server associated with the host entity. Specifically, volumes are assigned to one or more WWPNs associated with respective initiator ports. Assignment information indicating assignments of storage volumes to various initiator WWPNs is maintained by storage system 180. Storage system 180 grants access to the storage volume in accordance with the assignments, using a method referred to as "LUN masking." Examples of techniques for performing LUN masking are described below.

In the illustrative embodiment, access to volume-1 (491), shown in FIG. 4, is granted to server 135-A (and not to server 135-B or to any other server). Accordingly, volume-1 (491) is assigned to the WWPN of initiator port I-1 and to the WWPN of initiator port I-2 of server 135-A.

Accordingly, in an example of a LUN masking technique, when storage manager 410 of storage system 180 receives an I/O command specifying volume-1 (491), storage manager 410 retrieves from the I/O command information that may be used to determine the WWPN of the originating initiator port. If the storage volume is assigned to that particular WWPN, storage manager 410 provides access to the volume. For example, if an I/O command specifies volume-1 and originated at initiator port I-1, storage system 180 verifies that volume-1 is assigned to the WWPN of initiator port I-1, and grants access to volume-1. If the volume is not assigned to the originating WWPN, storage manager 410 rejects the I/O command, denying access to the volume.

Zoning

Figure 7:
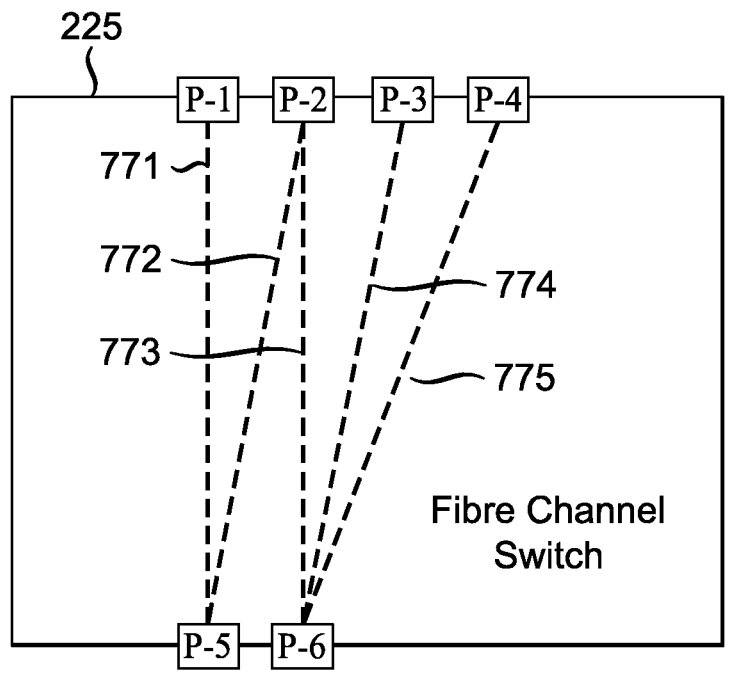
FIG. 7 shows an example of a zoning configuration that may be established within a Fibre channel switch in accordance with an embodiment.

Using a method referred to as zoning, internal paths between ports of FC switch 225 may be configured in accordance with one or more predetermined policies. For example, FC switch 225 may be configured to ensure that a first port of switch 225 is linked, or zoned, only to a specified second port of switch 225. Alternatively, FC switch 225 may be configured to ensure that a first specified port of FC switch 225 is zoned to two or more ports of FC switch 225. FIG. 7 shows an example of a zoning configuration that may be established within FC switch 225 in accordance with an embodiment. In the illustrative embodiment of FIG. 7, port P-1 is zoned to port P-5 via internal path 771, port P-2 is zoned to port P-5 via internal path 772 and to port P-6 via internal path 773, port P-3 is zoned to port P-6 via internal path 774, and port P-4 is zoned to port P-6 via internal path 775. Other zoning arrangements different from that shown in FIG. 7 may be used. In accordance with one zoning method known as hard-zoning, zoning is established based on switch ports. In accordance with the hard-zoning method, a first port may be zoned to a second port in the network based on a physical connection.

In a zoning method referred to as soft zoning, a zoning configuration can be established within FC switch 225 by defining relationships among initiator ports of server 135 and target ports of storage system 180 based on their respective world wide port names. An initiator port of a server 135 may be zoned to a target port of storage system 180 notwithstanding the physical connections between various ports. In accordance with the soft-zoning method, a first world wide port name may be zoned to a second world wide port name without regard to any physical connections.

In the illustrative embodiment (referring to FIGS. 2 and 7), initiator port I-1 of server 135-A can be zoned only to target port T-1 of storage system 180, specifically from initiator port I-1 to port P-1 of FC switch 225 via link 271, then internally to port P-5 of FC switch 225 via internal path 771, then to target port T-1 of storage system 180. Therefore, initiator port I-1 of server 135-A can transmit data to, and receive data from, only target port T-1 of storage system 180. Note that while in this example initiator port I-1 is connected to ports P-1 and P-5 of FC switch 225, initiator port I-1 could be connected to any other switch ports, using a soft zoning method based on WWPNs of various ports instead of physical ports.

A particular port may have an associated zone, defined as a set of ports in a network that are zoned to the particular port.

In the illustrative embodiment, initiator port I-2 of server 135-A is zoned to two target ports of storage system 180. Specifically, initiator port I-2 is zoned to target port T-1 through a first path from initiator port I-2 to port P-2 of FC switch 225 via link 272, then internally to port P-5 of FC switch 225 via internal path 772, then to target port T-1 of storage system 180 via link 281. Initiator port I-2 is also zoned to target port T-2 of storage system 180 through a second path from initiator port I-2 to port P-2 of FC switch 225 via link 272, then internally to port P-6 of FC switch 225 via internal path 773, then to target port T-2 of storage system 180 via link 282. Therefore, initiator port I-2 of server 135-A can transmit data to, and receive data from, both target ports T-1 and T-2 of storage system 180. As discussed above, the zoning configuration can be changed based on WWPNs of various ports, using a soft zoning method, notwithstanding the physical connections between various ports.

Multipath Functionality

In an embodiment, server 135-A includes functionality to determine relationships between paths defined by a particular zoning configuration within FC switch 225, as well as LUN masking within storage system 180, and various volumes maintained in storage system 180. For example, referring to FIG. 3, service manager 325 of server 135-A may include multipath functionality. Alternatively, such functionality may be implemented by a separate software application residing on server 135-A. Such a software application is sometimes referred to as multipath software application.

In the illustrative embodiment, service manager 325 uses multipath functionality to examine all available paths between server 135-A and storage system 180 (in view of any internal zoning established within FC switch 225 and LUN masking established in storage system 180) and to identify each storage volume that may be accessed via each respective path. Thus, service manager 325 determines that initiator port I-1 is zoned to only one target port, T-1, of storage system 180. Service manager 325 further determines that this particular path allows access to one particular storage volume. Service manager 325 additionally determines that initiator port I-2 is zoned to two ports, T-1 and T-2, of storage system 180. Service manager 325 also determines that each of these paths allows access to one storage volume. This determination may be performed based on the world wide port names associated with the respective initiator ports of server 135, and based on LUN masking.

The information obtained by service manager 325 concerning which volumes are accessible to each respective initiator port may be ambiguous and fail to specify how many unique volumes are accessible to the various initiator ports.

Service manager 325 uses multipath functionality to reconcile the accessible storage volumes to determine how many unique storage volumes are in fact accessible from initiator ports I-1 and I-2. In the illustrative embodiment, service manager 325 examines each of the three defined paths between server 135-A and storage system 180, and determine that all three paths enable access to the same volume-1 (491), rather than to three different storage volumes.

Using an additional aspect of multipath functionality, service manager 325 reroutes traffic between server 135-A and storage system 180, from a first path to a second path, as needed, to ensure continual communication concerning a particular storage volume. For example, if service manager 325 detects an interruption in the flow of data on link 281 between FC switch 225 and storage system 180, interrupting communications relating to volume-1 (491), service manager 325 may redirect all communications relating to volume-1 (491) to another available path that enables access to volume-1 (491), such as a path originating from initiator port I-2 that utilizes link 282.

Interceptor Appliance

In many enterprise-level storage systems, it is useful to add data management services to the existing storage system. For example, it is often useful to add functionality to copy data, perform a snapshot of a data image, back up data, replicate data, perform data migration from one storage device or system to another, etc. It is preferable to add such functionality without causing any interruption to the storage system's operations.

One solution is to add functionality to the server or host entity. For example, a specialized driver (e.g., a software application) may be installed in a server to intercept I/O commands transmitted to a storage system. However, this solution is disadvantageous for several reasons. Installing software on a server creates the risk that any problem with the installed application may slow down or even cause the server to crash. Another problem with this approach is that different software must be created suitable to the operating system platforms used on various servers. Creating different drivers for use on different servers is inefficient and undesirable.

The inventor has identified a solution that comprises systems and methods for inserting, into a Fibre channel-based network that includes a host entity and a storage system, a device, or appliance, having functionality to intercept all I/O commands transparently and to provide data management services with respect to data stored in the storage system. The inventor has further identified a solution comprising systems and methods for perform the insertion of such a device or appliance transparently, without interrupting the operation of the storage system, and without requiring any system downtime.

In accordance with various embodiments, a device, or appliance, is inserted in a selected location in a network. In one embodiment, the appliance is inserted in a path between the storage system and a Fibre channel switch. In another embodiment, the appliance is inserted in a path between the host entity and a Fibre channel switch. In another embodiment, the appliance is inserted in a path between a first Fibre channel switch and a second Fibre channel switch. In other embodiments, other arrangements may be used.

Storage-Side Interceptor

In one embodiment, a device located between a storage system and a switch in a network receives a first identifier associated with a first port of a storage system. The device uses the first identifier to spoof the first port of the storage system during a first communication with the switch. The device receives, from a host server connected to the switch, a request to register a second port of the host server. The request includes a second identifier associated with the second port. The device uses the second identifier to spoof the second port of the host server during a second communication with the storage system, and receives, from the storage system, information identifying data that is stored in the storage system and may be accessed by the second port of the host server.

Accordingly, in an illustrative embodiment, an interceptor appliance is inserted in a path between a selected port of FC switch 225 and a selected target port of storage system 180. The interceptor appliance determines the WWPN of the selected target port of storage system 180, determines the WWPN of each initiator port of a server, or host entity, that is zoned to the selected target port of storage system 180, and identifies all storage volumes in the storage system that are assigned to each respective WWPN of the server or host entity.

Figure 8:
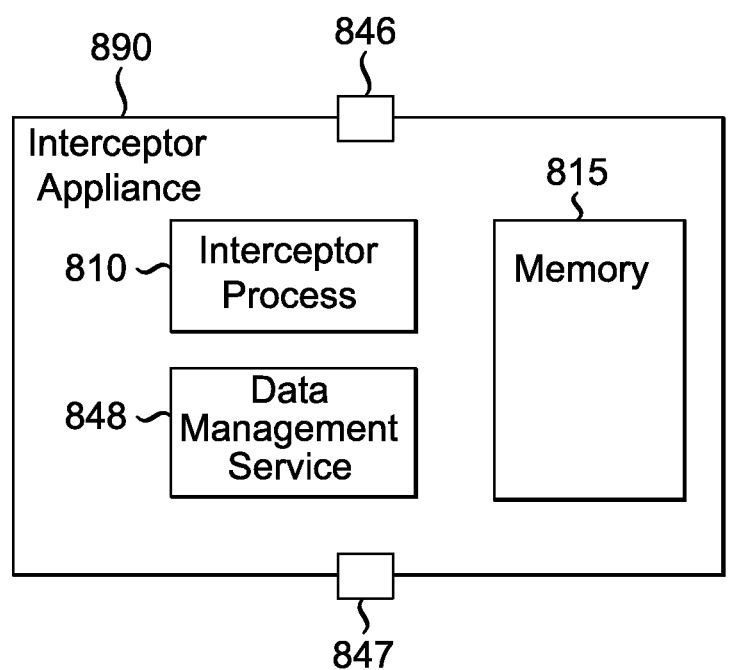
FIG. 8 shows functional components of an interceptor appliance in accordance with an embodiment.

FIG. 8 shows functional components of an interceptor appliance 890 in accordance with an embodiment. Interceptor appliance 890 comprises an interceptor process 810, a memory 815, and a data management service 848. Interceptor process 810 controls the operations of various components of interceptor appliance 890. Interceptor process 810 is a functional process that may be implemented by software, hardware, or a combination of software and hardware. Memory 815 is used by various components of interceptor appliance 890 to store data. Interceptor appliance 890 also comprises interceptor ports 846 and 847. Interceptor ports 846 and 847 may be implemented using one or more host bus adapters.

In one embodiment, interceptor appliance 890 comprises a computer. Other types of processing devices may be used.

Figure 9A:
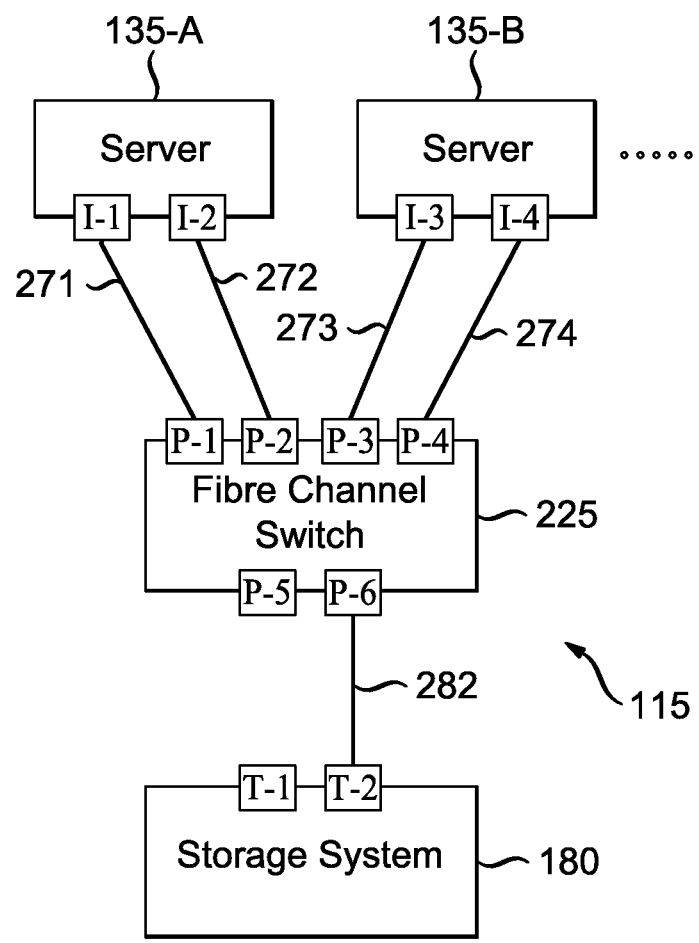
FIG. 9A shows the Fibre channel-based SAN of FIG. 2 after a link between the Fibre channel switch and a storage system has been removed, in accordance with an embodiment.

Interceptor appliance 890 may be inserted between a selected port of FC switch 225 and a target port of storage system 180 using any one of a variety of methods. For example, in an illustrative embodiment, link 281 between port P-5 of FC switch 225 and target port T-1 of storage system 180 is removed, as shown in FIG. 9A.

Multipath functionality in server 135 ensures that removal of link 281 does not interrupt the flow of data with respect to any volume maintained in storage system 180. For example, service manager 325 of server 135 may detect the removal of link 281 and determine that initiator port I-1 can no longer communicate with storage system 180. Service manager 325 may use multipath functionality to determine that any I/O command relating to volume-1 may be redirected from initiator port I-1 (which can no longer communicate with storage system 180 due to removal of link 281) to initiator port I-2, which also has access to volume-1 and can communicate with storage system 180 through another available path.

Figure 9B:
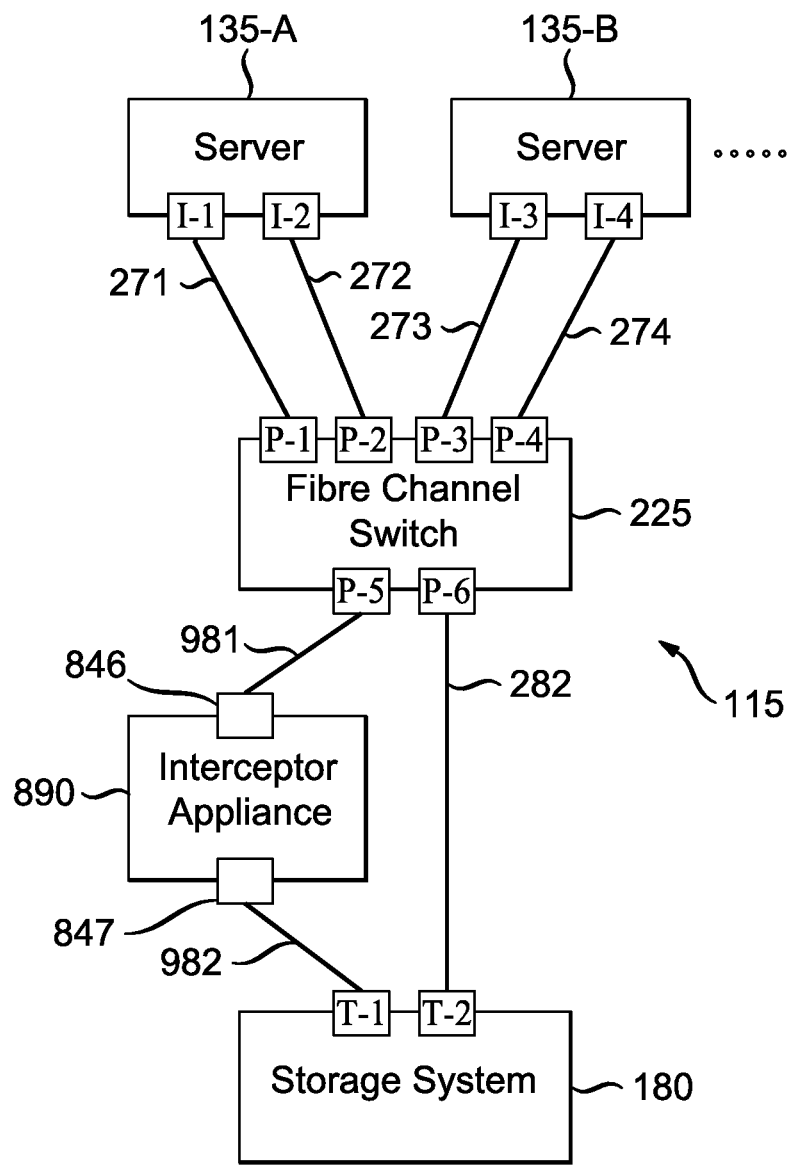
FIG. 9B shows the Fibre channel-based SAN of FIG. 2 after an interceptor appliance has been inserted between the Fibre channel switch and a storage system, in accordance with an embodiment.

In the illustrative embodiment, interceptor appliance 890 is inserted in the following manner. Referring to FIG. 9B, interceptor port 846 of interceptor appliance 890 is connected to port P-5 of FC switch 225 by a link 981, and interceptor port 847 is connected to target port T-1 of storage system 180 by a link 982.

In other embodiments, other devices may be inserted, for example, between interceptor appliance 890 and FC switch 225, or between interceptor appliance 890 and storage system 180.

Figure 10:
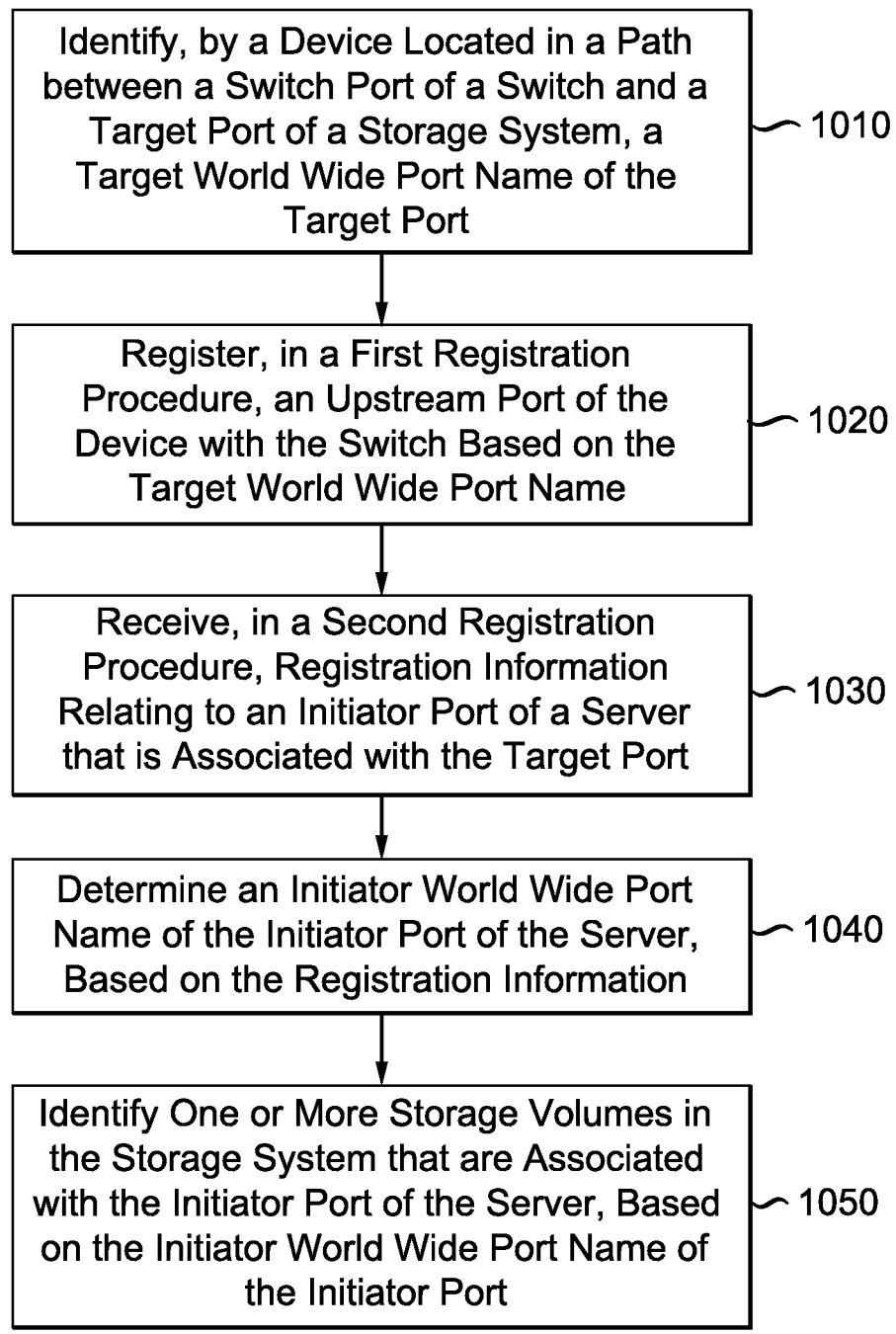
FIG. 10 is a flowchart of a method for communicating with components of a network, in accordance with an embodiment.

Interceptor appliance 890 now communicates with components of Fibre channel-based SAN 115 in order to obtain information concerning data stored in storage system 180. FIG. 10 is a flowchart of a method for communicating with a components of a network, in accordance with an embodiment. At step 1010, a target world wide port name of a target port of a storage system is identified, by a device located in a path between a switch port of a switch and the target port of the storage system. In the illustrative embodiment, when target port T-1 of storage system 180 is connected to interceptor port 847 of interceptor appliance 890, target port T-1 attempts to register with interceptor appliance 890. Accordingly, target port T-1 transmits to interceptor appliance 890 a request to register, or to complete a Fibre channel log-in. The request contains the WWPN of target port T-1. Interceptor appliance 890 receives the request and retrieves the WWPN of target port T-1.

At step 1020, an upstream port of the device is registered with the switch based on the target world wide port name, in a first registration procedure, or Fibre channel log-in procedure. In the illustrative embodiment, (upstream) interceptor port 846 uses the WWPN of target port T-1 to spoof target port T-1 and obtain information from FC switch 225. Specifically, interceptor appliance 890 transmits from (upstream) interceptor port 846 a request to register with FC switch 225. The request to register includes the target world wide port name of target port T-1 (and may additionally include a second world wide port name unique to interceptor port 846). FC switch 225 receives the request to register and registers interceptor port 846 based on the target world wide port name of target port T-1. FC switch 225 may additionally register interceptor port 846 based on the second world wide port name unique to interceptor port 846.

At step 1030, registration information relating to an initiator port of a server that is associated with the target port is received, in a second registration procedure. In the illustrative embodiment, the registration information received from an initiator port includes information identifying the initiator port's world wide port name. In other embodiment, the registration information may include another type of identifier associated with the initiator port, such as a port number. The registration information received from an initiator port may also include information specifying a switch port to which the initiator port is connected.

Accordingly, when interceptor port 846 registers with FC switch 225 using the world wide port name of target port T-1, all initiator ports of any server 135 (or host entity) that are zoned to target port T-1 register with interceptor port 846, in a second registration procedure. During the second registration procedure, each initiator port transmits registration information identifying its respective world wide port name. Thus, each of initiator ports I-1 and I-2 (which are zoned to target port T-1) registers with interceptor port 846 and provides to interceptor port 846 information specifying its world wide port name. Specifically, initiator port I-1 provides in the registration information its world wide port name (WWPN-1) and initiator port I-2 provides its world wide port name (WWPN-2). Initiator port I-1 may also include in the registration information a switch port identifier identifying switch port P-1, to which it is connected. Initiator port I-2 may also include in the registration information a switch port identifier identifying switch port P-2, to which it is connected.

At step 1040, an initiator world wide port name of the initiator port of the server (or host entity) is determined, based on the registration information. Thus, interceptor appliance 890 obtains the world wide port name of each initiator port of server 135-A from the registration information that was received. Specifically, interceptor process 810 of interceptor appliance 890 determines that WWPN-1 is the world wide port name of initiator port I-1 and that WWPN-2 is the world wide port name of initiator port I-2. In this manner, interceptor appliance 890 determines the initiator world wide port name of each initiator port of server 135-A that is zoned to target port T-1 of storage system 180.

In an alternative embodiment, the registration information received from an initiator port does not include the initiator port's world wide port name, but includes a switch port identifier identifying a switch port to which the initiator port is connected. For example, initiator port I-1 provides registration information indicating that it is connected to switch port P-1, and initiator port I-2 provides registration information indicating that it is connected to switch port P-2. Interceptor appliance 890 accordingly accesses and examines Simple Name Server table 650 and identifies, for each switch port identifier received, a corresponding initiator world wide port name. Specifically, interceptor process 810 of interceptor appliance 890 consults Simple Name Server Table 650 and determines that WWPN-1 is associated with switch port identifier P-1 (and thus is linked to port P-1 of FC switch 225), and that WWPN-2 is associated with switch port identifier P-2 (and thus is linked to port P-2 of FC switch 225).

In another embodiment, interceptor appliance 890 may spoof target port T-1 and transmit from (upstream) interceptor port 846 a request to register with FC switch 225 (the request including the target world wide port name of target port T-1), as in step 1020. In response, FC switch 225 accesses Simple Name Server Table 650 and provides to interceptor appliance 890 information specifying one or more initiator ports of server 135-A that are zoned to target port T-1.

At step 1050, one or more storage volumes in the storage system that are associated with the initiator port are identified, based on the initiator world wide port name of the initiator port. In the illustrative embodiment, interceptor appliance 890 now spoofs each initiator port of server 135 to obtain information from storage system 180. Specifically, interceptor process 810 of interceptor appliance 890 uses a standard procedure to add the initiator world wide port names of the initiator ports that are zoned to target port T-1 to (downstream) interceptor port 847 of interceptor appliance 890. Thus interceptor process 810 adds WWPN-1 and WWPN-2 to interceptor port 847. After the initiator world wide port names are added to interceptor port 847, interceptor process 810 may obtain from storage system 180 information identifying one or more volumes to which each respective initiator world wide port name has access, in the manner described below.

For each initiator world wide port name now associated with port 847 of interceptor appliance 890, interceptor process 810 transmits to storage system 180 a command specifying the respective initiator WWPN and requesting information identifying the volumes to which the initiator WWPN has access. For example, interceptor process 810 may transmit a REPORT LUN command in accordance with SCSI protocols. Storage system 180 receives the command and, in response, transmits information indicating one or more volumes to which the specified initiator WWPN has access. Thus, in the illustrative embodiment, interceptor process 810 transmits to storage system 180 a REPORT LUN command specifying WWPN-1. In response, storage system 180 transmits to interceptor appliance 890 information indicating that WWPN-1 has access to volume-1 (491). Interceptor process 810 also transmits to storage system 180 a REPORT LUN command specifying WWPN-2. In response, storage system 180 informs interceptor appliance 890 that WWPN-2 has access to volume-1 (491). In other embodiments, interceptor appliance 890 may use a different type of identifier associated with an initiator port, such as a port number, to spoof the initiator port and determine information identifying data which the initiator port may access.

As discussed above, in some embodiments the information received from storage system 180 concerning which volumes are accessible to each respective initiator world wide port name may be ambiguous and fail to specify how many unique volumes are accessible to the various initiator world wide port names. As a result, interceptor appliance 890 may interpret the information obtained from storage system 180 as indicating more storage volumes that actually exist. Therefore, interceptor appliance 890 may reconcile the information received from storage system 180 to determine if the identified storage volumes are unique, or if two or more of the identified storage volumes are identical and therefore redundant.

Accordingly, in one embodiment, interceptor process 810 transmits a command (such as a SCSI command referred to as an INQUIRY command) to each identified volume to obtain the global unique identifier (GUID) associated with the volume. In response to the command, the volume transmits to interceptor appliance 890 a message specifying its global unique identifier. Based on the GUIDs received in this manner, interceptor process 810 determines how many unique volumes are present and whether any of the identified volumes are redundant. The implementation of the global unique identifier for each volume may vary based on the manufacturer of the storage system. In some embodiments, non-standard commands may be required to retrieve the information which constitutes the GUID.

Using the methods described herein, interceptor appliance 890 identifies an initiator WWPN that is zoned to a selected target port of storage system 180, and identifies one or more volumes within storage system 180 that the initiator WWPN may access. This method may be used to identify multiple WWPNs associated with a selected server (or host entity). Interceptor appliance 180 may then identifies all volumes within storage system 180 that the WWPNs may access. Interceptor appliance 890 may therefore identify all volumes to which the server or host entity has access.

While the examples described herein discuss systems, apparatus and methods for identifying volumes in a storage system that may be accessed by an initiator port or host entity, in other embodiments, the methods, apparatus and systems described herein may be used to identify any data structure to which a particular initiator port, or host entity, has access. For example, the methods, apparatus, and systems described herein may be used to identify, without limitation, files, databases, physical sectors on a disk drive, etc., that may be accessed by a particular initiator port or host entity.

The systems and methods described herein advantageously allow the insertion of interceptor appliance 890 in the data path between FC switch 225 and storage system 180 such that all I/O commands may be intercepted transparently. The systems and methods described herein further allow insertion of the interceptor appliance 890 transparently, without interrupting the operation of storage system 180 or of the network.

Provision of Data Management Services by Storage-Side Interceptor

In accordance with an embodiment, interceptor appliance 890 provides one or more data management services with respect to data stored in storage system 180. Referring to FIG. 8, interceptor appliance 890 comprises a data management service 848 which includes functionality to provide one or more data management services. For example, data management service 848 may include functionality to copy data, to perform a snapshot of a data image, to back up data, to replicate data, to perform data migration from one storage device or system to another, etc. Data management service 848 may comprise user interface functions. For example, the storage volumes and host entities identified by interceptor appliance 890 using the methods described herein may be presented to a user by use of a user interface to facilitate selection by the user of one or more volumes and one or more services that the user wishes to have performed with respect to the selected volumes.

Figure 11:
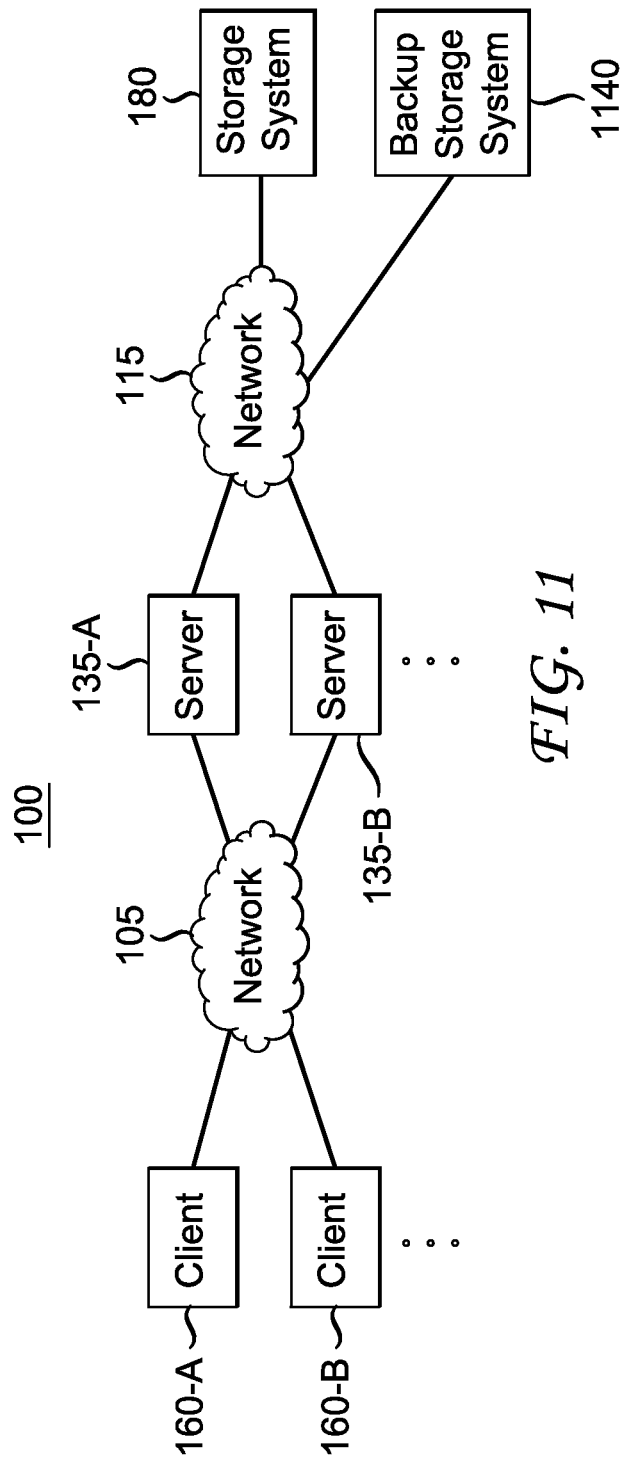
FIG. 11 shows a communication system that may be used to provide data storage services and data management services in accordance with an embodiment.

In one embodiment, after identifying one or more volumes to which a particular server or host entity has access, in the manner described above, interceptor appliance 890 may use this information to provide one or more data management services. FIG. 11 shows another embodiment of communication system 100 that may be used to provide data management services. In the embodiment of FIG. 11, communication system 100 also comprises a backup storage system 1140 linked to network 115. In an illustrative embodiment, interceptor appliance 890 includes functionality to copy one or more volumes to which a particular host entity (in this example, server 135-A) is granted access. Accordingly, interceptor appliance 890 identifies a volume in storage system 180 to which the host entity has access, and copies the volume to backup storage system 1140.

To ensure a complete and accurate copy in the event that new data is written to the volume by the host entity while data is being copied, interceptor appliance 890 records the locations of any data that is written to the volume during the copy procedure. In this manner, interceptor appliance 890 keeps track of new data written to the volume. After a first pass is completed, interceptor appliance 890 consults the record indicating the locations of new data and copies the new data in a subsequent pass. Additional passes may be performed as well.

Figure 12:
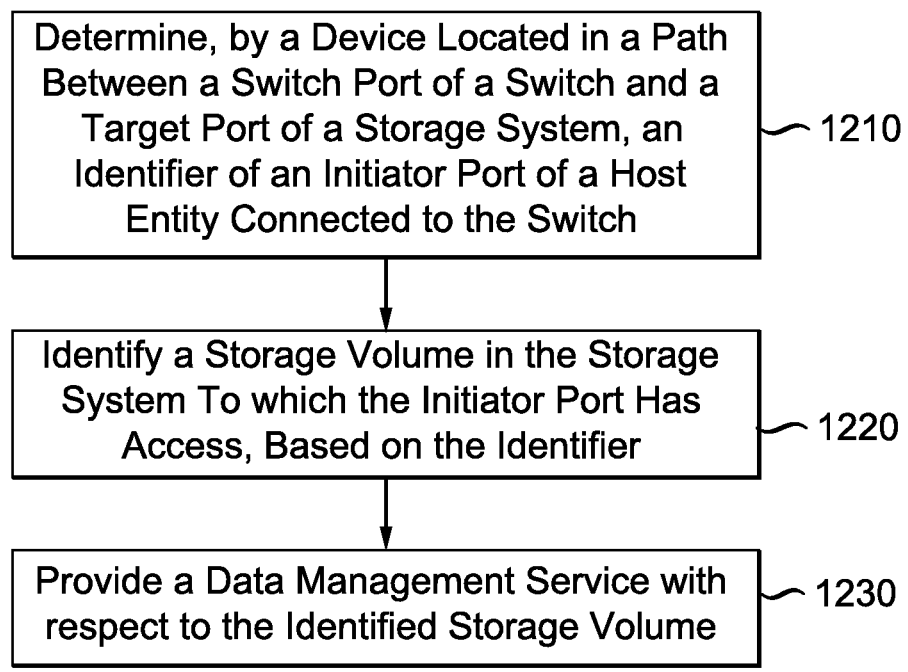
FIG. 12 is a flowchart of a method of providing data management services in accordance with an embodiment.

FIG. 12 is a flowchart of a method of providing data management services in accordance with an embodiment. At step 1210, an identifier of an initiator port of a host entity connected to a switch is determined by a device located in a path between a switch port of the switch and a target port of a storage system. In the manner described above, interceptor process 810 of interceptor appliance 890 identifies the initiator WWPN of initiator port I-1 of the host entity (server 135-A). In the illustrative embodiment, the WWPN of initiator port I-1 is WWPN-1.

At step 1220, a storage volume in the storage system to which the initiator port has access is identified, based on the identifier. In the illustrative embodiment, interceptor process 810 determines that WWPN-1 has access to volume-1 maintained in storage system 180, in the manner described above.

After a volume in storage system 180 is identified, with detailed and precise information specifying one or more initiator WWPNs of the host entity, interceptor appliance 890 may intercept I/O commands and determine the origin of each I/O command received. This allows data management service 848 (of interceptor appliance 890) to perform one or more selected actions with respect to each I/O command based on the origin of the I/O command.

At step 1230, a data management service is provided with respect to the identified storage volume. Referring to FIG. 8, data management service 848 (of interceptor appliance 890) accesses volume-1 and copies the data in volume-1 to another volume. In the illustrative embodiment of FIG. 11, data management service 848 copies data in volume-1 to a volume in backup storage system 1140.

Before copying data, data management service 848 instructs interceptor process 810 to intercept all data write commands. Data management service 848 then commences copying data in the volume from the beginning to the end in a sequential manner. While the copying procedure is being performed, new data may be written to portions of the volume that have already been copied. To ensure an up-to-date copy, data management service 848 records the locations of all new data that is written to the volume. After a first pass is completed, data management service 848 copies the locations where new data has been written, in a subsequent pass. Additional passes may be performed if necessary.

In other embodiments, data managements service 848 may provide other types of services, such as performing a snapshot of a data image, replicating data, performing data migration from one storage device or system to another, etc. When other functions are performed, interceptor process 810 intercepts I/O commands as necessary to enable such functions to be performed. In another embodiment, data management service 848 may monitor I/O commands sent to and from a selected volume maintained in storage system 180, and may generate statistics relating to the I/O commands. In another embodiment, data management service 848 may monitor traffic to and from a selected storage volume and call a predetermined function to perform a specified action, if a predetermined condition is detected. For example, data management service 848 may notify an administrator if a specified initiator port writes data to the selected volume.

Host-Side Interceptor

In accordance with another embodiment, an interceptor appliance is inserted in a path between a selected port of FC switch 225 and a selected host entity. The interceptor appliance determines the world wide port name of each initiator port of the host entity. The world wide port names of various initiator ports may be received by the interceptor appliance automatically (for example, from other devices) or may be entered manually, by a user, into the interceptor appliance. Then, for each respective initiator port of the host entity, the interceptor appliance determines the world wide port name of each target port of storage system 180 that is zoned to the respective initiator port. The world wide port names of various target ports may be received automatically, or may be entered manually, by a user, into the interceptor appliance. The interceptor appliance identifies storage volumes in the storage system that are assigned to the respective initiator port. The methods described herein may be performed while allowing pass-through of normal communications between the host entity and the storage system (including exchange of I/O commands and other data traffic) to continue.

Figure 13:
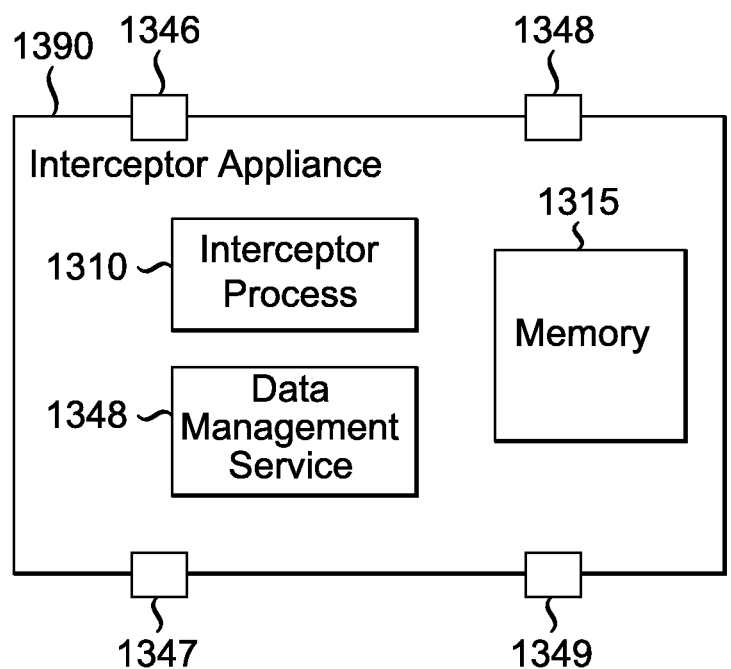
FIG. 13 shows functional components of an interceptor appliance in accordance with another embodiment.

FIG. 13 shows functional components of an interceptor appliance 1390 in accordance with another embodiment. Interceptor appliance 1390 comprises an interceptor process 1310, a memory 1315, and a data management service 1348, which are similar to the corresponding components shown in the embodiment of FIG. 8. Interceptor appliance 1390 also comprises interceptor ports 1346, 1347, 1348, and 1349. Interceptor ports 1346, 1347, 1348, and 1349 may be implemented using one or more host bus adapters.

In one embodiment, interceptor appliance 1390 comprises a computer. Other types of processing devices may be used.

Figure 14A:
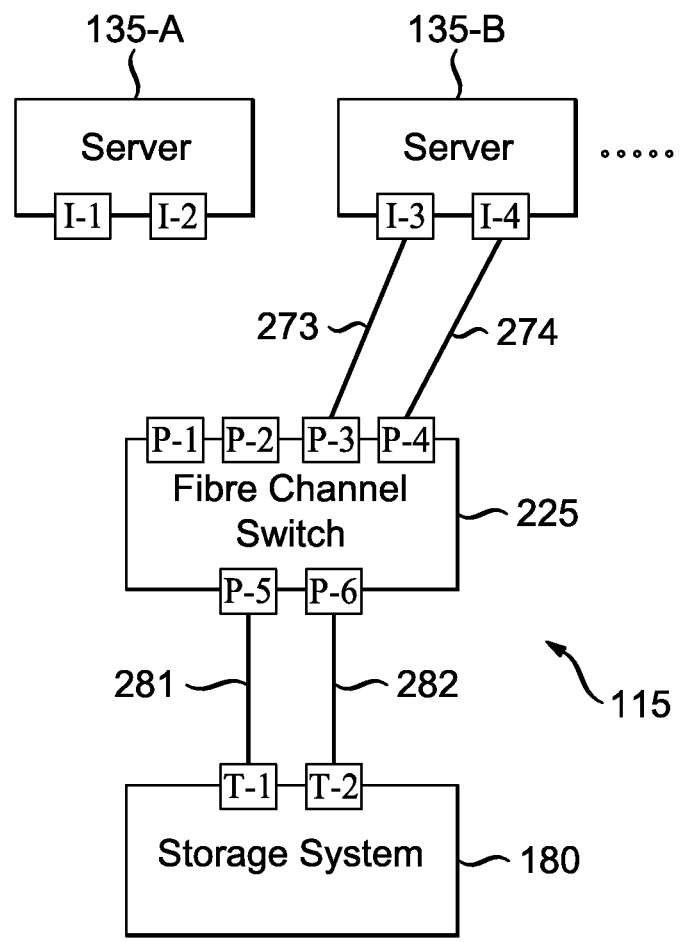
FIG. 14A shows the Fibre channel-based SAN of FIG. 2 after a link between the Fibre channel switch and a host entity has been removed.

Interceptor appliance 1390 may be inserted in a path between a selected port of FC switch 225 and a host entity using any one of a variety of methods. For example, in an illustrative embodiment shown in FIG. 14A, link 271 between port P-1 of FC switch 225 and initiator port I-1 of server 135-A, and link 272 between port P-2 of FC switch 225 and initiator port I-2 of server 135-A, are removed, and interceptor appliance 1390 is inserted between FC switch 225 and server 135-A.

Figure 14B:
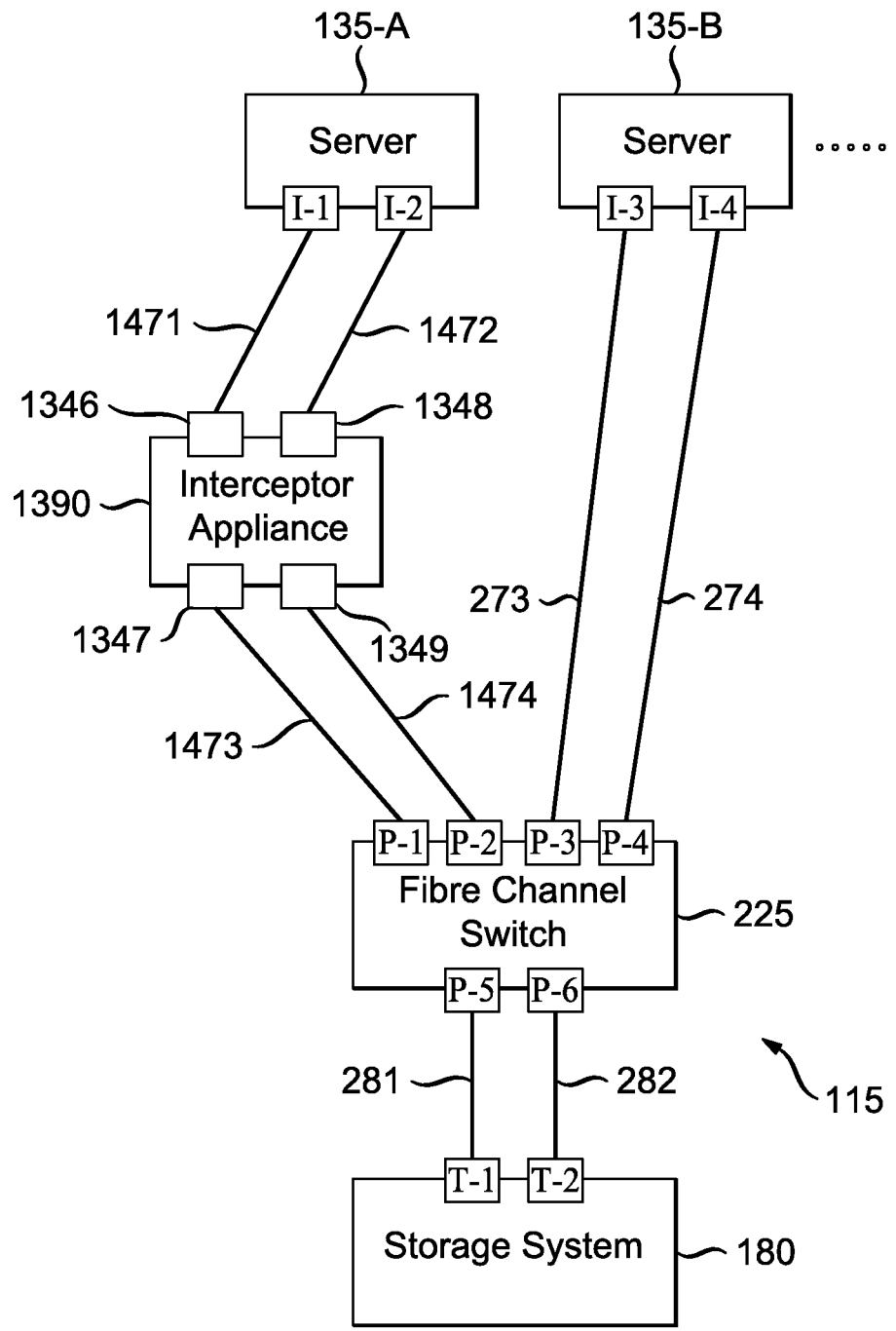
FIG. 14B shows the Fibre channel-based SAN of FIG. 2 after an interceptor appliance has been inserted between the Fibre channel switch and a host entity, in accordance with an embodiment.

Referring to FIG. 14B, interceptor appliance 1390 may be inserted in the following manner. Interceptor port 1346 of interceptor appliance 1390 is connected to port I-1 of server 135-A by a link 1471, and interceptor port 1348 of interceptor appliance 1390 is connected to port I-2 of server 135-A by a link 1472. Interceptor port 1347 of interceptor appliance 1390 is connected to port P-1 of FC switch 225, and interceptor port 1349 of interceptor appliance 1390 is connected to port P-2 of FC switch 225.

In other embodiments, other devices may be inserted, for example, between interceptor appliance 1390 and FC switch 225, or between interceptor appliance 1390 and server 135-A.

Figure 15:
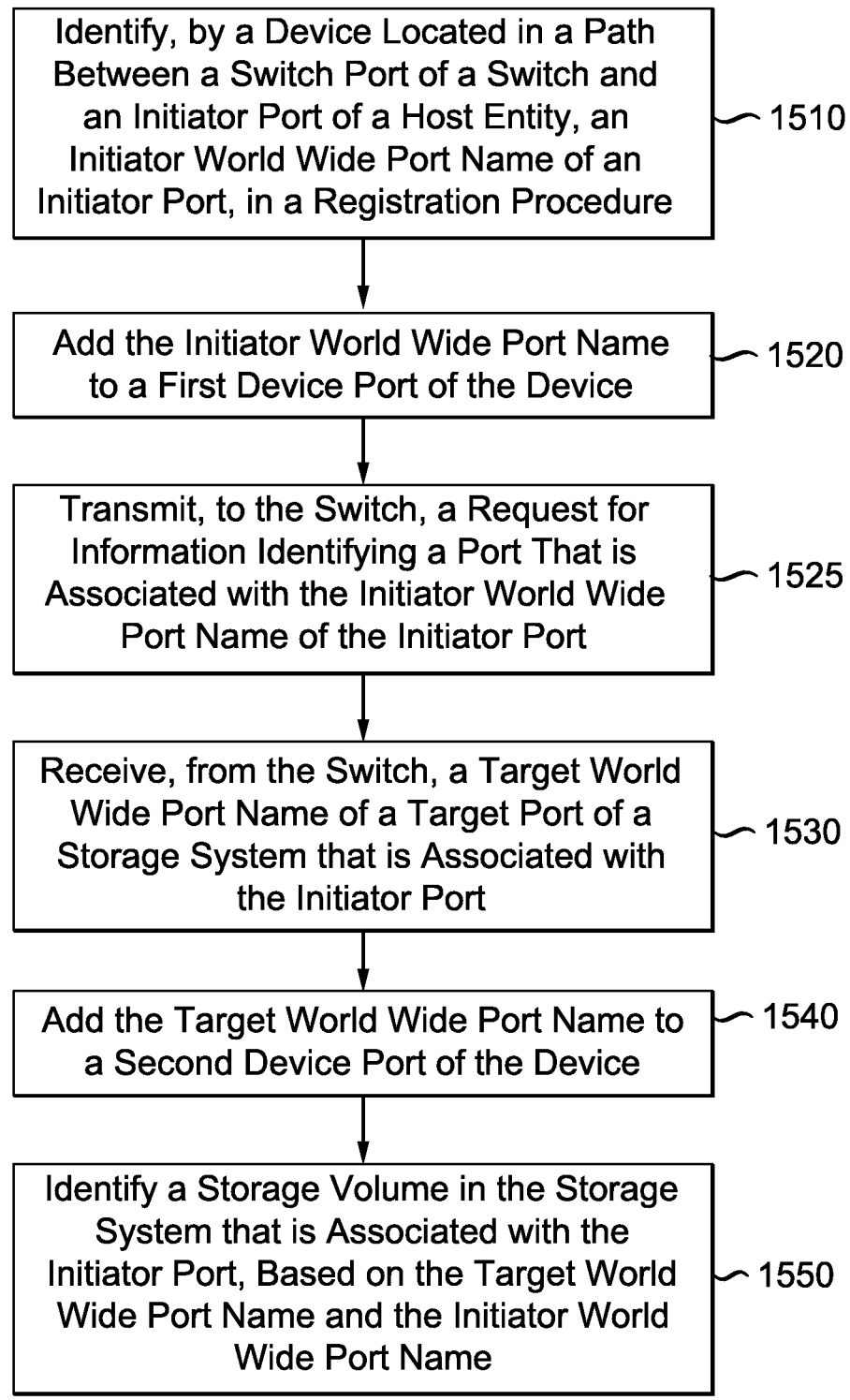
FIG. 15 is a flowchart of a method of determining information related to data stored in a network, in accordance with an embodiment.

Interceptor appliance 1390 now communicates with components of Fibre channel-based SAN 115 in order to obtain information concerning data stored in storage system 180. FIG. 15 is a flowchart of a method of determining information related to data stored in a network, in accordance with an embodiment.

At step 1510, an initiator world wide port name of an initiator port of a host entity is identified, by a device located in a path between a switch port of a switch and the initiator port, in a registration procedure. In the illustrative embodiment, when initiator port I-1 of server 135-A is connected to interceptor port 1346 of interceptor appliance 1390, initiator port I-1 detects interceptor port 1346 and attempts to register with interceptor appliance 1390. Accordingly, initiator port I-1 transmits to interceptor appliance 1390 a request to register. For example, the request to register may comprise a request to complete a Fibre channel log-in. The request contains the world wide port name of initiator port I-1 (WWPN-1). Interceptor appliance 1390 receives the request and retrieves the world wide port name of initiator port I-1. In another embodiment, the request received from initiator port I-1 may include a different type of identifier associated with initiator port I-1, such as a port number.

In another embodiment, a user may enter the world wide port name of initiator port I-1 (WWPN-1) into interceptor appliance 1390 manually.

At step 1520, the initiator world wide port name is added to a first device port of the device. In the illustrative embodiment, interceptor process 1310 of interceptor appliance 1390 uses a standard procedure to add the initiator world wide port name of initiator port I-1 (WWPN-1) to (downstream) interceptor port 1347 of interceptor appliance 1390.

At step 1525, a request for information identifying a port that is associated with the initiator world wide port name of the initiator port is transmitted to the switch. Interceptor appliance 1390 uses the world wide port name of initiator port I-1 (WWPN-1) to spoof initiator port I-1 during an interaction with FC switch 225. Specifically, interceptor appliance 1390 transmits to FC switch 225, via interceptor port 1347, a request for information identifying ports that are zoned to initiator port I-1. The request includes WWPN-1, the initiator world wide port name of initiator port I-1. In another embodiment, the request may include a different type of identifier associated with initiator port I-1, such as a port number. FC switch 225 receives the request and determines a response.

At step 1530, a target world wide port name of a target port of a storage system that is associated with the initiator port is received from the switch. In response to the request for information received from interceptor appliance 1390, FC switch 225 accesses Simple Name Server Table 650 and retrieves information identifying ports that are zoned to initiator port I-1. In another embodiment, FC switch 225 retrieves information identifying ports that are zoned to WWPN-1. In the illustrative embodiment, target port T-1 is zoned to initiator port I-1 (WWPN-1); accordingly, FC switch 225 transmits to interceptor appliance 1390 information identifying target port T-1, including the target world wide port name of target port T-1 (WWPN-5). In another embodiment, FC switch 225 may transmit to interceptor appliance 1390 another type of identifier associated with target port T-1, such as a port number.

In another embodiment, a user may enter the target world wide port name of target port T-1 (WWPN-5) into interceptor appliance 1390 manually.

At step 1540, the target world wide port name is added to a second device port of the device. In order to ensure that communications between server 135-A and storage system 180 continue with minimal or with no interruption, interceptor process 1310 adds the target world wide port name of target port T-1 (WWPN-5) to (upstream) interceptor port 1346 of interceptor appliance 1390. When server 135-A determines that initiator port I-1 is connected to interceptor port 1346 (now spoofing target port T-1), server 135-A registers with (upstream) interceptor port 1346. For example, server 135-A may perform a Fibre channel log-in procedure to register with interceptor port 1346.

Server 135-A now transmits data, requests, and other communications intended for target port T-1 of storage system 180 to (upstream) interceptor port 1346. Interceptor appliance 1390 allows such communications to pass through to storage system 180 (via FC switch 225) with little or no interruption. In this manner, interceptor appliance 1390 re-establishes a transparent path between initiator port I-1 of server 135-A and target port T-1 of storage system 180.

The steps described above are also employed to identify stored data that may be accessed by initiator port I-2 of server 135-A. In the illustrative embodiment, when initiator port I-2 of server 135-A is connected to interceptor port 1348 of interceptor appliance 1390, initiator port I-2 attempts to register with interceptor appliance 1390. Accordingly, initiator port I-2 transmits to interceptor appliance 1390 a request to register, or to complete a Fibre channel log-in. The request contains the world wide port name of initiator port I-2 (WWPN-2). Interceptor appliance 1390 receives the request and retrieves the world wide port name of initiator port I-2.

After interceptor appliance 1390 obtains WWPN-2, interceptor appliance 1390 uses the world wide port name of initiator port I-2 to spoof initiator port I-2 during a communication with FC switch 225. Specifically, interceptor process 1310 of interceptor appliance 1390 uses a standard procedure to add the initiator world wide port name of initiator port I-2 to (downstream) interceptor port 1349 of interceptor appliance 1390. Thus interceptor process 1310 adds WWPN-2 to interceptor port 1349. Interceptor appliance 1390 now transmits to FC switch 225 a request for information identifying ports that are zoned to interceptor port I-2 (WWPN-2). In the illustrative embodiment, both target port T-1 and target port T-2 are zoned to interceptor port I-2 (WWPN-2), via switch ports P-2, P-5, and P-6, as seen in FIGS. 2 and 7. Accordingly, FC switch 225 receives the request and sends to interceptor appliance 1390 a message indicating that target port T-1 and target port T-2 are zoned to WWPN-2. The response also includes the world wide port names of target ports T-1 and T2.

Interceptor process 1310 now adds the world wide port names of target ports T-1 and T-2 to (upstream) interceptor port 1348, to enable transparent communications between initiator port I-2 of server 135-A and storage system 180. Server 135-A detects the added world wide port names and resumes transmitting communications to storage system 180 via initiator port I-2.

Advantageously, the methods, systems, and apparatus described herein allow a transparent, or nearly transparent, pass-through of commands and other data traffic between the host entity and the storage system, after the interceptor device has been inserted into the network. This feature provides the opportunity and ability to intercept, analyze, redirect, and/or reprocess the I/O commands and other data traffic flowing between host entity and the storage system.

In the illustrative embodiment, interceptor appliance 1390 examines data stored in storage system 180. In particular, at step 1550, a storage volume in the storage system that is associated with the initiator port is identified, based on the target world wide port name and the initiator world wide port name. In the illustrative embodiment, interceptor appliance 1390 now spoofs initiator port I-1 of server 135-A to obtain information from storage system 180. Interceptor appliance 1390 also spoofs initiator port I-2 of server 135-A to obtain information from storage system 180. Specifically, for each initiator world wide port name now associated with either port 1347 or 1349 of interceptor appliance 1390, interceptor process 1310 transmits to storage system 180 a command specifying the respective initiator WWPN and requesting information identifying the volumes to which the initiator WWPN has access. The command may also specify a target world wide port name that is zoned to the initiator WWPN. For example, interceptor process 1310 may transmit to storage system 180 a REPORT LUN command in accordance with SCSI protocols. Storage system 180 receives the command and, in response, transmits information indicating one or more volumes to which the specified initiator WWPN has access. Thus, in the illustrative embodiment, interceptor process 1310 may transmit to storage system 180 a REPORT LUN command specifying WWPN-1. In response, storage system 180 transmits to interceptor appliance 1390 information indicating that WWPN-1 has access to volume-1 (491). Interceptor process 1310 may also transmit to storage system 180 a REPORT LUN command specifying WWPN-2. In response, storage system 180 informs interceptor appliance 1390 that WWPN-2 has access to volume-1 (491). In other embodiments, interceptor appliance 1390 may use a different type of identifier associated with an initiator port, such as a port number, to spoof the initiator port and determine information identifying data which the initiator port may access.

As discussed above, in some embodiments the information received from storage system 180 concerning which volumes are accessible to each respective initiator world wide port name may be ambiguous and fail to specify how many unique volumes are accessible to the various initiator world wide port names. As a result, interceptor appliance 1390 may interpret the information obtained from storage system 180 as indicating more storage volumes that actually exist. Therefore, interceptor appliance 1390 may reconcile the information received from storage system 180 to determine if the identified storage volumes are unique, or if two or more of the identified storage volumes are identical and therefore redundant.

Accordingly, in one embodiment, interceptor process 1310 transmits a command (such as a SCSI command referred to as an INQUIRY command) to each identified volume to obtain the global unique identifier (GUID) associated with the volume. In response to the command, the volume transmits to interceptor appliance 1390 a message specifying its global unique identifier. Based on the GUIDs received in this manner, interceptor process 1310 determines how many unique volumes are present and whether any of the identified volumes are redundant. The implementation of the global unique identifier for each volume may vary based on the manufacturer of the storage system. In some embodiments, non-standard commands may be required to retrieve the information which constitutes the GUID.

Using the methods described above, interceptor appliance 1390 identifies an initiator WWPN of an initiator port of a host entity, identifies a target port of a storage system that is zoned to the initiator WWPN, and identifies one or more volumes within storage system 180 that the initiator WWPN may access. The method may be repeated for multiple initiator ports of a host entity. Accordingly, this method may be used to identify multiple WWPNs associated with a selected server (or host entity). Interceptor appliance 180 may then identify all volumes within storage system 180 that the WWPNs may access. Interceptor appliance 1390 may therefore identify all volumes to which the server or host entity has access.

The systems and methods described herein advantageously allow the insertion of interceptor appliance 1390 in the data path between FC switch 225 and a host entity or server such that all I/O commands may be intercepted transparently. The systems and methods described herein further allow insertion of interceptor appliance 1390 transparently, without interrupting the operation of storage system 180 or of the network.

Provision of Data Management Services by Host-Side Interceptor

In accordance with an embodiment, interceptor appliance 1390 provides one or more data management services with respect to data stored in storage system 180. Referring to FIG. 13, interceptor appliance 1390 comprises a data management service 1348 which includes functionality to provide one or more data management services. For example, data management service 1348 may include functionality to copy data, to perform a snapshot of a data image, to back up data, to replicate data, to perform data migration from one storage device or system to another, etc. Data management service 1348 may comprise user interface functions. For example, the storage volumes and host entities identified by interceptor appliance 1390 using the methods described herein may be presented to a user by use of a user interface to facilitate selection by the user of one or more volumes and one or more services that the user wishes to have performed with respect to the selected volumes.

In one embodiment, after identifying one or more volumes to which a particular server or host entity has access, in the manner described above, interceptor appliance 1390 may use this information to provide one or more data management services. For example, interceptor appliance 1390 may include functionality to copy one or more volumes to which a particular host entity (in this example, server 135-A) is granted access. Accordingly, interceptor appliance 1390 may identify a volume in storage system 180 to which the host entity has access, and copy the volume to a backup storage system such as backup storage system 1140 shown in FIG. 11.

To ensure a complete and accurate copy in the event that new data is written to the volume by the host entity while data is being copied, interceptor appliance 1390 records the locations of any data that is written to the volume during the copy procedure. In this manner, interceptor appliance 1390 keeps track of new data written to the volume. After a first pass is completed, interceptor appliance 1390 consults the record indicating the locations of new data and copies the new data in a subsequent pass. Additional passes may be performed as well.

Figure 16:
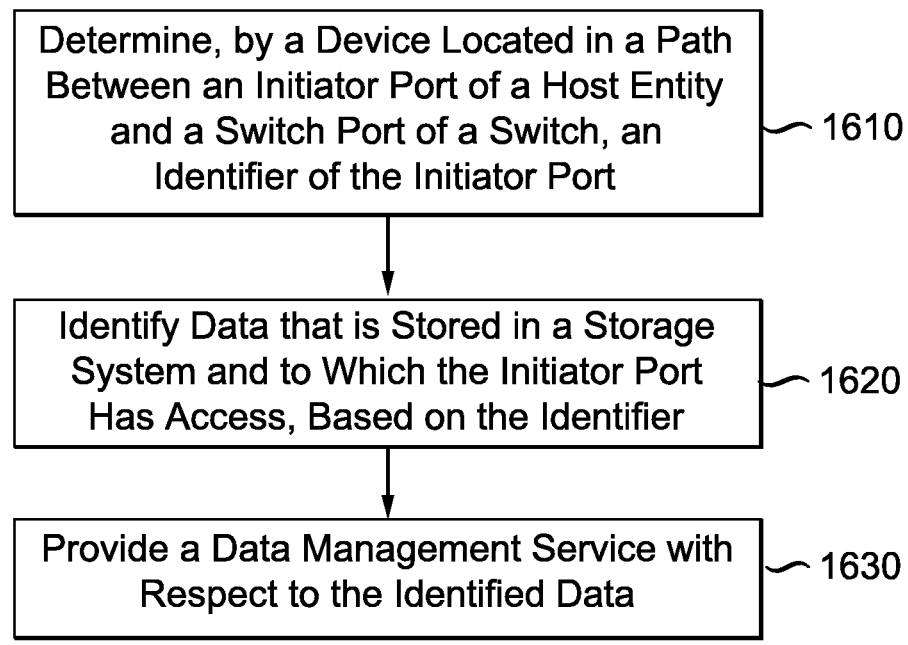
FIG. 16 is a flowchart of a method of providing data management services in accordance with another embodiment.

FIG. 16 is a flowchart of a method of providing data management services in accordance with an embodiment. At step 1610, an identifier of an initiator port of a host entity is determined by a device located in a path between the initiator port and a switch port of a switch. In the manner described above, interceptor process 1310 of interceptor appliance 1390 receives from a host entity (e.g., server 135-A) the world wide port name of initiator port I-1. In the illustrative embodiment, the world wide port name of initiator port I-1 is WWPN-1.

At step 1620, data that is stored in a storage system and which the initiator port has access to is identified, based on the identifier. In the illustrative embodiment, interceptor process 1310 uses WWPN-1 to spoof initiator port I-1, in the manner described above, and determines that WWPN-1 has access to volume-1 maintained in storage system 180.

After a volume in storage system 180 is identified, with detailed and precise information specifying one or more initiator WWPNs of the host entity, interceptor appliance 1390 may intercept I/O commands and determine the origin of each I/O command received. This allows data management service 1348 (of interceptor appliance 1390) to perform one or more selected actions with respect to each I/O command based on the origin of the I/O command.

At step 1630, a data management service is provided with respect to the identified data. For example, referring to FIG. 13, data management service 1348 (of interceptor appliance 1390) may access volume-1 and copy the data in volume-1 to another volume. Referring to FIG. 11, data management service 1348 may copy data in volume-1 to a volume in backup storage system 1140.

Before copying data, data management service 1348 instructs interceptor process 1310 to intercept all data write commands. Data management service 1348 then commences copying data in the volume from the beginning to the end in a sequential manner. While the copying procedure is being performed, new data may be written to portions of the volume that have already been copied. To ensure an up-to-date copy, data management service 1348 records the locations of all new data that is written to the volume. After a first pass is completed, data management service 1348 copies the locations where new data has been written, in a subsequent pass. Additional passes may be performed if necessary.

In other embodiments, data management service 1348 may provide other types of services, such as performing a snapshot of a data image, replicating data, performing data migration from one storage device or system to another, etc. When other functions are performed, interceptor process 1310 intercepts I/O commands as necessary to enable such functions to be performed. In another embodiment, data management service 1348 may monitor I/O commands sent to and from a selected volume maintained in storage system 180, and may generate statistics relating to the I/O commands. In another embodiment, data management service 1348 may monitor traffic to and from a selected storage volume and call a predetermined function to perform a specified action, if a predetermined condition is detected. For example, data management service 1348 may notify an administrator if a specified initiator port writes data to the selected volume.

Multiple Switch Configuration

In another embodiment, an interceptor appliance may be inserted in a Fibre channel network in a path between a first Fibre channel switch and a second Fibre channel switch. Such a configuration may advantageously allow the interceptor appliance to access and communicate with an increased number of host entities and/or an increased number of storage systems.

Figure 17:
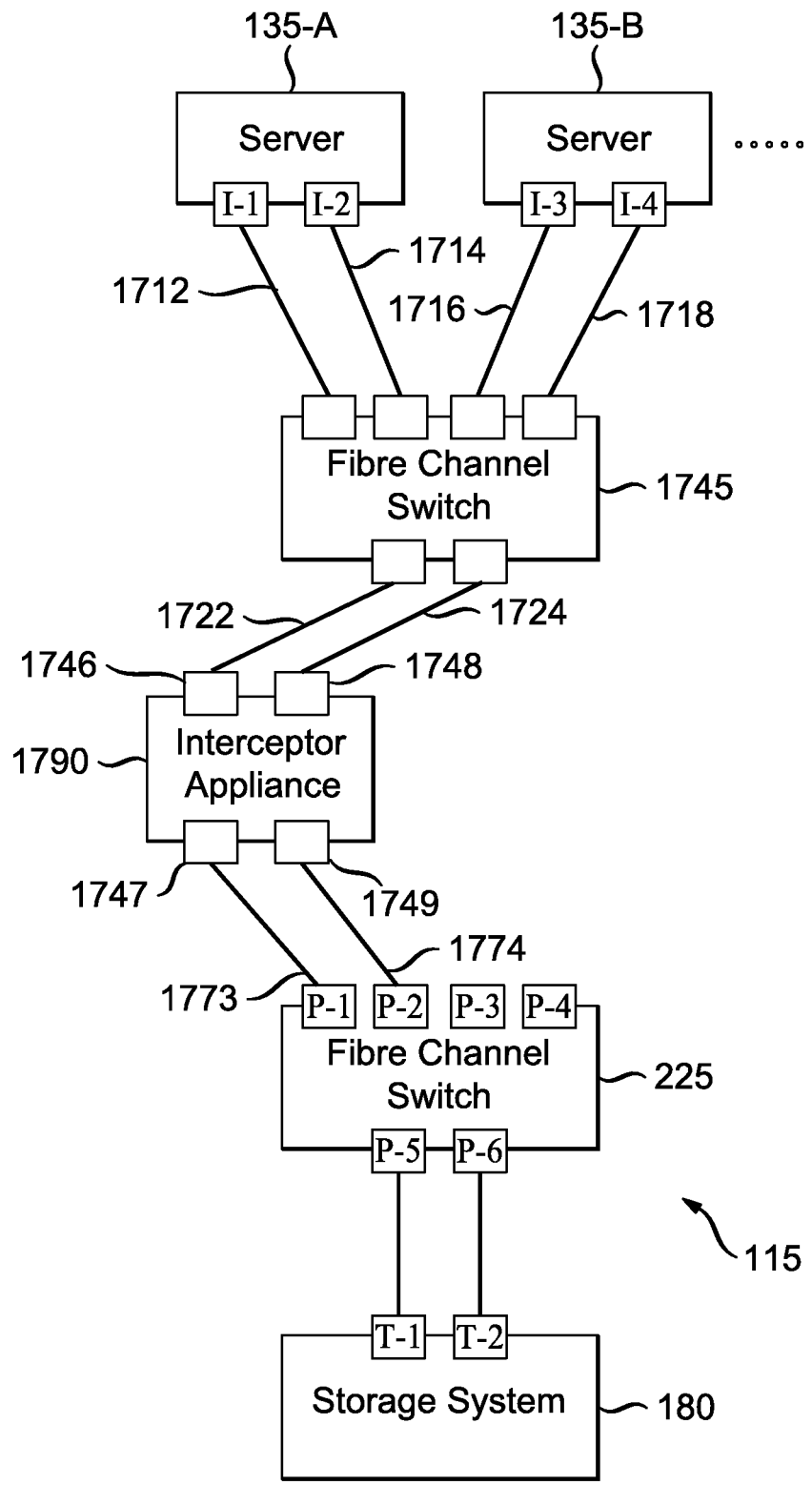
FIG. 17 shows a Fibre channel-based SAN in which an interceptor appliance has been inserted in a path between a first Fibre channel switch and a second Fibre channel switch in accordance with an embodiment.

In an illustrative embodiment shown in FIG. 17, network 115 includes FC switch 225, a second FC switch 1745, and an interceptor appliance 1790. Second switch 1745 is connected to server 135-A via links 1712 and 1714, and to server 135-B via links 1716 and 1718.

Interceptor appliance 1790 is inserted between FC switch 225 and second FC switch 1745. Specifically, ports 1746 and 1748 of interceptor appliance 1790 are connected to second FC switch 1745 via links 1722 and 1724, respectively. Ports 1747 and 1749 of interceptor appliance 1790 are connected to ports P-1 and P-2 of FC switch 225 via links 1773 and 1774, respectively.

Figure 18:
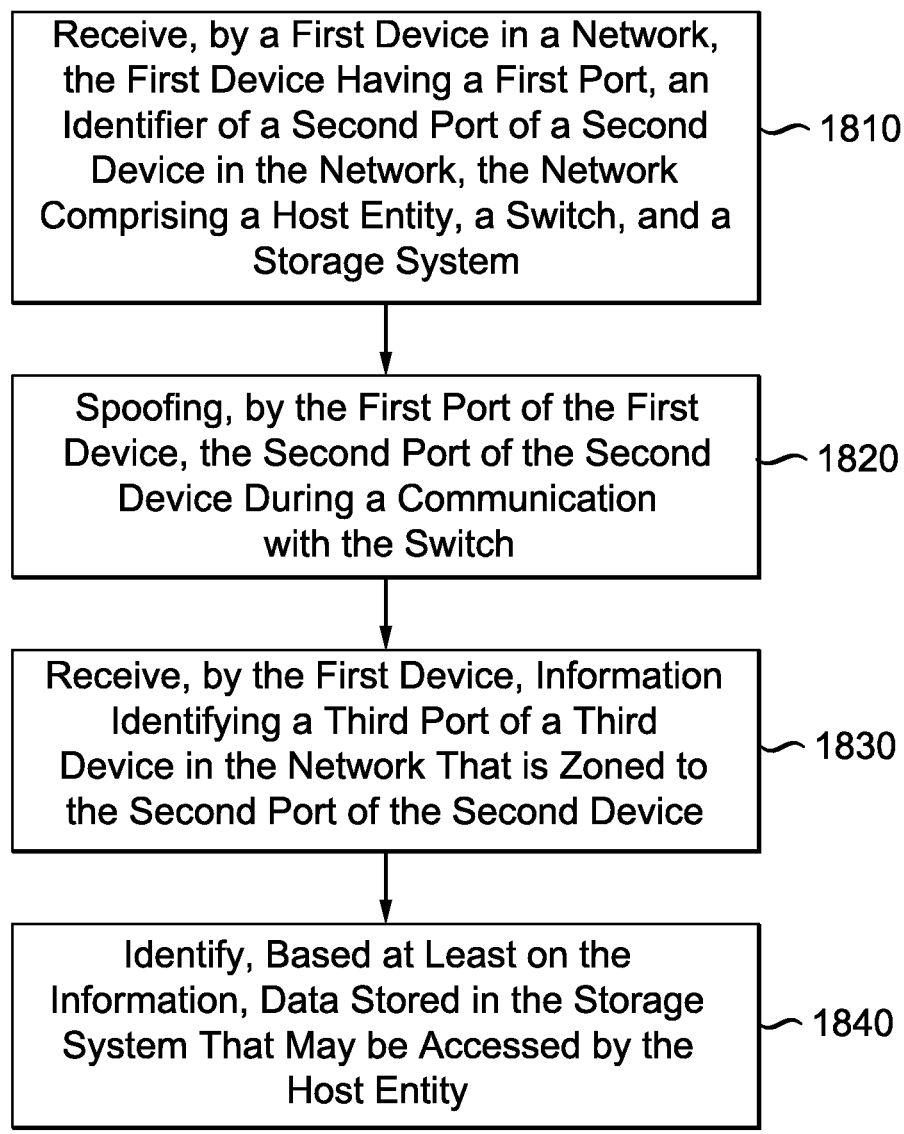
FIG. 18 is a flowchart of a method of obtaining information stored in a network in accordance with another embodiment.

After being connected to FC switch 225 and second FC switch 1745, interceptor appliance 1790 obtains information relating to data stored in network 115. FIG. 18 is a flowchart of a method of obtaining information stored in a network in accordance with an embodiment.

At step 1810, a first device in a network receives an identifier of a second port of a second device in the network, the first device having a first port, the network comprising a host entity, a switch, and a storage system. In the illustrative embodiment, when interceptor appliance 1790 is connected to second FC switch 1745, server 135-A detects ports 1746 and 1748 of interceptor appliance 1790 and transmits requests for registration via each of its ports (I-1 and I-2). Server 135-B also transmits requests for registration via each of its ports (I-3 and I-4). Interceptor appliance 1790 receives a world wide port name (WWPN-1) of interceptor port I-1 of server 135-A, and similarly receives respective world wide port names from initiator ports I-2, I-3, and I-4. In another embodiment, a user may enter the world wide port name (WWPN-1) of interceptor port I-1 into interceptor appliance 1790 manually.

At step 1820, the second port of the second device is spoofed by the first port of the first device during a communication with the switch. In a manner similar to that discussed above, the world wide port name (WWPN-1) received from server 135-A is added to a selected port of interceptor appliance 1790, such as (downstream) port 1747.

At step 1830, information identifying a third port of a third device in the network that is zoned to the second port of the second device is received by the first device. In a manner similar to that described above, interceptor appliance 1790 receives from FC switch 225 information (obtained in part from Simple Name Server table 650) specifying target port T-1, which is zoned to initiator port I-1, and the world wide port name of target port T-1. In another embodiment, a user may enter the world wide port name of target port T-1 into interceptor appliance 1790 manually.

At step 1840, data stored in the storage system that may be accessed by the host entity is identified based at least on the information. Based on the determination that target port T-1 of storage system 180 is zoned to initiator port I-1, interceptor appliance 1790 uses the world wide port name WWPN-1 of initiator port I-1 to communicates with storage system 180 and identify a storage volume which may be accessed by initiator port I-1.

In a similar manner, interceptor appliance 1790 may identify one or more storage volumes that may be accessed by initiator port I-2 of server 135-A. Interceptor appliance 1790 may also identify one or more storage volumes that may be accessed by each of initiator ports I-3 and I-4 of server 135-B.

In accordance with an embodiment, interceptor appliance 1790 provides one or more data management services with respect to data stored in storage system 180, such as, for example, the storage volume(s) that may be accessed by initiator ports I-1, I-2, I-3, and I-4. In a manner similar to the methods described above and shown in FIGS. 12 and 16, interceptor appliance 1790 may copy data, perform a snapshot of a data image, back up data, replicate data, perform data migration from one storage device or system to another, etc.

While the embodiments described herein are described in the context of a Fibre channel-based SAN, the methods and systems described herein are not limited to use within a Fibre channel-based SAN. In other embodiments, methods and systems described herein may be used in connection with other types of communication systems and networks. For example, methods and systems described herein may be used in a communication system using iSCSI protocols.

In various embodiments, the method steps described herein, including the method steps described in FIG. 10, 12, 15, 16 and/or 18, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 10, 12, 15, 16 and/or 18, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 19:
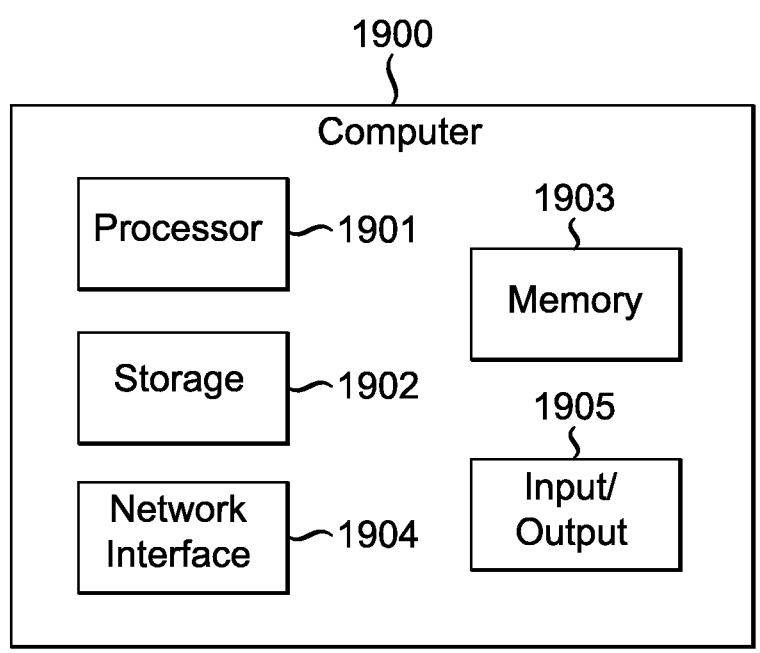
FIG. 19 shows an exemplary computer that may be used to implement certain embodiments of the invention.

A high-level block diagram of an exemplary computer that may be used to implement systems, apparatus and methods described herein is illustrated in FIG. 19. Computer 1900 includes a processor 1901 operatively coupled to a data storage device 1902 and a memory 1903. Processor 1901 controls the overall operation of computer 1900 by executing computer program instructions that define such operations. The computer program instructions may be stored in data storage device 1902, or other computer readable medium, and loaded into memory 1903 when execution of the computer program instructions is desired. Thus, the method steps of FIG. 10, 12, 15, 16 and/or 18 can be defined by the computer program instructions stored in memory 1903 and/or data storage device 1902 and controlled by the processor 1901 executing the computer program instructions. For example, the computer program instructions can be implemented as computer executable code programmed by one skilled in the art to perform an algorithm defined by the method steps of FIG. 10, 12, 15, 16 and/or 18. Accordingly, by executing the computer program instructions, the processor 1901 executes an algorithm defined by the method steps of FIG. 10, 12, 15, 16 and/or 18. Computer 1900 also includes one or more network interfaces 1904 for communicating with other devices via a network. Computer 1900 also includes one or more input/output devices 1905 that enable user interaction with computer 1900 (e.g., display, keyboard, mouse, speakers, buttons, etc.).

Processor 1901 may include both general and special purpose microprocessors, and may be the sole processor or one of multiple processors of computer 1900. Processor 1901 may include one or more central processing units (CPUs), for example. Processor 1901, data storage device 1902, and/or memory 1903 may include, be supplemented by, or incorporated in, one or more application-specific integrated circuits (ASICs) and/or one or more field programmable gate arrays (FPGAs).

Data storage device 1902 and memory 1903 each include a tangible non-transitory computer readable storage medium. Data storage device 1902, and memory 1903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1905 may include peripherals, such as a printer, scanner, display screen, etc. For example, input/output devices 1905 may include a display device such as a cathode ray tube (CRT) or liquid crystal display (LCD) monitor for displaying information to the user, a keyboard, and a pointing device such as a mouse or a trackball by which the user can provide input to computer 1900.

Any or all of the systems and apparatus discussed herein, including client 160, server 135, Fibre channel switches 225 and 1745, storage system 180, interceptor appliances 890, 1390, and 1790, and components thereof, including service manager 325, memory 375, storage manager 410, memory 475, storage 468, switch manager 525, memory 575, interceptor process 810, memory 815, data management service 848, interceptor process 1310, memory 1315, data management service 1348, and all ports within any of these apparatus or components, may be implemented using a computer such as computer 1900.

One skilled in the art will recognize that an implementation of an actual computer or computer system may have other structures and may contain other components as well, and that FIG. 19 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of providing data management services, the method comprising:
   determining, by a device located in a path between a first port of a host entity and a second port of a switch, an identifier of the first port;
   adding the identifier of the first port of the host entity to a third port of the device;
   transmitting, by the device, to the switch, a request for information identifying one or more ports that are zoned to the first port of the host entity;

receiving information relating to a storage system in response to the request;

identifying data that is stored in a storage system and to which the first port has access, based on the information received; and providing a data management service with respect to the identified data.

2. The method of claim 1, further comprising:

spoofing, by the device, the first port, during a communication with the switch.

3. The method of claim 2, further comprising:

transmitting to the switch a request for information identifying one or more ports that are zoned to the first port.

4. The method of claim 3, further comprising:

transmitting to the storage system a REPORT LUN command including the identifier; and receiving from the storage system, in response to the REPORT LUN command, information identifying a storage volume to which the identifier has access.

5. The method of claim 1, wherein the identifier comprises a world wide port name.

6. The method of claim 1, wherein the data management service includes one of: copying data, performing a snapshot of a data image, replicating data, performing a data migration service, monitoring I/O commands sent to and from a selected volume maintained in the storage system, generating statistics relating to I/O commands, and calling a predetermined function to perform a specified action based on a detection of a predetermined condition.

7. A device comprising:

a memory storing computer program instructions; and a processor communicatively coupled to the memory, the processor configured to execute the computer program instructions which, when executed on the processor, cause the processor to perform operations comprising:

determining that the device is located in a path between a first port of a host entity and a second port of a switch;

determining an identifier of the first port;

adding the identifier of the first port of the host entity to a third port of the device;

transmitting, by the device, to the switch, a request for information identifying one or more ports that are zoned to the first port of the host entity;

receiving information relating to a storage system in response to the request;

identifying data that is stored in a storage system and to which the first port has access, based on the information received; and providing a data management service with respect to the identified data.

8. The device of claim 7, the operations further comprising:

spoofing the first port during a communication with the switch.

9. The device of claim 8, the operations further comprising:

transmitting to the switch a request for information identifying one or more ports that are zoned to the first port.

10. The device of claim 9, the operations further comprising:

transmitting to the storage system a REPORT LUN command including the identifier; and receiving from the storage system, in response to the REPORT LUN command, information identifying a storage volume to which the identifier has access.

11. The device of claim 7, wherein the identifier comprises a world wide port name.

12. The device of claim 7, wherein the data management service includes one of: copying data, performing a snapshot of a data image, replicating data, performing a data migration service, monitoring I/O commands sent to and from a selected volume maintained in the storage system, generating statistics relating to I/O commands, and calling a predetermined function to perform a specified action based on a detection of a predetermined condition.

13. A non-transitory computer readable medium having program instructions stored thereon, that, in response to execution by a computing device, cause the computing device to perform operations comprising:

determining that the computing device is located in a path between a first port of a host entity and a second port of a switch;

determining an identifier of the first port;

adding the identifier of the first port of the host entity to a third port of the device;

transmitting, by the device, to the switch, a request for information identifying one or more ports that are zoned to the first port of the host entity;

receiving information relating to a storage system in response to the request;

identifying data that is stored in a storage system and to which the first port has access, based on the information received; and providing a data management service with respect to the identified data.

14. The non-transitory computer readable medium of claim 13, the operations further comprising:

spoofing, by the device, the first port, during a communication with the switch.

15. The non-transitory computer readable medium of claim 14, the operations further comprising:

transmitting to the switch a request for information identifying one or more ports that are zoned to the first port.

16. The non-transitory computer readable medium of claim 15, the operations further comprising:

transmitting to the storage system a REPORT LUN command including the identifier; and receiving from the storage system, in response to the REPORT LUN command, information identifying a storage volume to which the identifier has access.

17. The non-transitory computer readable medium of claim 13, wherein the identifier comprises a world wide port name.

18. The non-transitory computer readable medium of claim 13, wherein the data management service includes one of: copying data, performing a snapshot of a data image, replicating data, performing a data migration service, monitoring I/O commands sent to and from a selected volume maintained in the storage system, generating statistics relating to I/O commands, and calling a predetermined function to perform a specified action based on a detection of a predetermined condition.

* * * * *